United States Patent
Li et al.

(10) Patent No.: US 11,518,059 B2
(45) Date of Patent: Dec. 6, 2022

(54) CHAINSAW

(71) Applicant: Nanjing Chervon Industry Co., Ltd., Nanjing (CN)

(72) Inventors: Li Li, Nanjing (CN); Kaichao Dai, Nanjing (CN); Chenzhong Zhang, Nanjing (CN); Hekun Wu, Nanjing (CN); Haiyan Li, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 0 days.

(21) Appl. No.: 17/835,291

(22) Filed: Jun. 8, 2022

(65) Prior Publication Data

US 2022/0297338 A1   Sep. 22, 2022

Related U.S. Application Data

(63) Continuation of application No. PCT/CN2020/091341, filed on May 20, 2020.

(30) Foreign Application Priority Data

Dec. 31, 2019 (CN) .......................... 201911411309.9

(51) Int. Cl.
*B27B 17/02* (2006.01)
*H01M 50/247* (2021.01)
*B27B 17/00* (2006.01)

(52) U.S. Cl.
CPC .......... *B27B 17/02* (2013.01); *B27B 17/0008* (2013.01); *H01M 50/247* (2021.01); *H01M 2220/30* (2013.01)

(58) Field of Classification Search
None
See application file for complete search history.

(56) References Cited

U.S. PATENT DOCUMENTS 4,483,070 A * 11/1984 Junkermann ............ A01G 3/08
30/296.1
4,876,490 A * 10/1989 Kolb ........................ A01G 3/00
318/254.2

(Continued)

FOREIGN PATENT DOCUMENTS

CN          2698539 Y    5/2005
CN       201816142 U    5/2011
(Continued)

OTHER PUBLICATIONS

ISA/CN, Translation of Int. Search Report issued on PCT application No. PCT/CN2020/091341, dated Sep. 10, 2020, 3 pages.
(Continued)

*Primary Examiner* — Hwei-Siu C Payer
(74) *Attorney, Agent, or Firm* — Greenberg Traurig, LLP

(57) ABSTRACT

A chainsaw includes a main machine, a battery pack, and a connection assembly. The battery pack is configured to supply energy to the main machine. Moreover, the battery pack and the main machine are separated from each other. The connection assembly is configured to connect the main machine and the battery pack so that the battery pack is electrically connected to the main machine. The main machine includes a chain, a guide plate, a motor, and a housing. The chain is configured to perform a cutting function. The guide plate is configured to support the chain. The motor is configured to drive the chain to move. The housing is configured to accommodate at least part of the motor. The connection assembly is detachably connected to the main machine or the battery pack.

21 Claims, 21 Drawing Sheets

(56) References Cited

U.S. PATENT DOCUMENTS

| | | | | |
|---|---|---|---|---|
| 10,892,449 B2* | 1/2021 | Yamaoka | ............ | H01M 50/256 |
| 11,178,958 B2* | 11/2021 | Nordmann | ................ | A45F 3/04 |
| 2007/0240892 A1* | 10/2007 | Brotto | .................... | B25D 11/00 |
| | | | | 83/788 |
| 2016/0006005 A1* | 1/2016 | Sakakibara | ........... | H01M 50/24 |
| | | | | 429/7 |

FOREIGN PATENT DOCUMENTS

| | | | |
|---|---|---|---|
| CN | 202367273 U | | 8/2012 |
| CN | 206389832 U | | 8/2017 |
| CN | 207273156 U | | 4/2018 |
| CN | 109664373 A | | 4/2019 |
| EP | 2 072 200 A1 | * | 6/2009 |
| EP | 2 521 206 A1 | * | 12/2012 |
| JP | 2017013296 A | | 1/2017 |
| WO | 2012/039488 A1 | | 3/2012 |
| WO | WO 2020/119730 A1 | * | 2/2020 |

OTHER PUBLICATIONS

ISA/CN, Int. Search Report issued on PCT application No. PCT/CN2020/091341, dated Sep. 10, 2020, 4 pages.

ISA/CN, Written Opinion issued on PCT application No. PCT/CN2020/091341, dated Sep. 10, 2020, 3 pages.

ISA/CN, Translation of Written Opinion issued on PCT application No. PCT/CN2020/091341, dated Sep. 10, 2020, 4 pages.

* cited by examiner

CHAINSAW

RELATED APPLICATION INFORMATION

This application is a continuation of International Application Number PCT/CN2020/091341, filed on May 20, 2020, through which this application also claims the benefit under 35 U.S.C. § 119(a) of Chinese Patent Application No. 201911411309.9, filed on Dec. 31, 2019, all of which are incorporated herein by reference in their entirety.

BACKGROUND

As a garden-type power tool, chainsaws are widely used in households, gardens and other fields. For a chainsaw in the related art, an energy device that supplies an energy source is usually mounted directly on the main machine of the chainsaw. As a result, the weight of the main machine is heavy and the chainsaw is inconvenient for a user to operate.

SUMMARY

The present application provides a chainsaw which can be easily operated by a user.

An example of the present application provides a chainsaw. The chainsaw includes a main machine, a battery pack and a connection assembly. The battery pack is configured to supply energy to the main machine. Moreover, the battery pack and the main machine are separated from each other. The connection assembly is configured to connect the main machine and the battery pack so that the battery pack is electrically connected to the main machine. The main machine includes a chain, a guide plate, a motor and a housing. The chain is configured to perform a cutting function. The guide plate is configured to support the chain. The motor is configured to drive the chain to move. The housing is configured to accommodate at least part of the motor. The connection assembly is detachably connected to the main machine or the battery pack. The guide plate extends forward out of the housing, and the ratio of the weight of the main machine to the length of the portion of the guide plate extending out of the housing is greater than or equal to 7.5 kg/m and less than or equal to 14.5 kg/m.

In one example, the connection assembly includes a safety component. When a force applied to the safety component is greater than or equal to a preset safety value, the safety component is opened to make the battery pack disconnected from the main machine by the connection assembly.

In one example, the connection assembly further includes a safety rope. The safety component is mounted on the safety rope. Moreover, the safety component is configured to be connected to the main machine.

In one example, the connection assembly further includes a mounting base and a power cord. The mounting base is configured as a base for the battery pack to be mounted on. The power cord includes a first end configured to be connected to the battery pack or the mounting base and a second end configured to be connected to the main machine. The second end of the power cord is detachably connected to the main machine.

In one example, the housing includes a power insertion interface. An access terminal is disposed inside the power insertion interface. The second end of the power cord is provided with a power output interface detachably connected to the power insertion interface. The safety component is a safety valve. When a force applied to the safety valve is greater than or equal to the preset safety value, the safety valve is opened so that the safety component is disconnected from the main machine and so that the power cord is separated from the power insertion interface.

In one example, the preset safety value is greater than or equal to 15 pounds and less than or equal to 400 pounds.

In one example, the preset safety value is greater than or equal to 25 pounds and less than or equal to 200 pounds.

In one example, the mounting base includes a base and a connector. The base is configured to combine the battery pack. The connector is configured to make the mounting base mounted to the waistband of a user.

In one example, the mounting base includes a base, a first connector and a second connector. The base is configured to combine the battery pack. The first connector is configured to make the mounting base mounted to the waistband of a user in a first connection manner. The second connector is configured to make the mounting base mounted to the waistband of a user in a second connection manner. The first connector is a non-flexible member, and the second connector is a flexible member.

In one example, the connection assembly includes a mounting base and a power cord. The mounting base is configured as a base for the battery pack to be mounted on. The power cord includes a first end configured to be connected to the battery pack or the mounting base and a second end configured to be connected to the main machine. The mounting base includes a base and a connector. The base is configured to combine the battery pack. The connector is configured to make the mounting base mounted to the waistband of a user. The connector is a flexible member.

In one example, the connection assembly includes a mounting base and a power cord. The mounting base is configured as a base for the battery pack to be mounted on. The power cord includes a first end configured to be connected to the battery pack or the mounting base and a second end configured to be connected to the main machine.

In one example, the safety rope surrounds the surface of the power cord.

In one example, the length of the safety rope is substantially fixed.

In one example, the safety rope is a non-elastic rope.

In one example, the ratio of the length of the power cord to the length of the portion of the guide plate extending out of the housing is greater than or equal to 2 and less than or equal to 10.

In one example, the power cord includes a wire core and an insulating sleeve. The insulating sleeve surrounds the wire core. The safety rope has a length direction. The safety rope is formed with a through hole extending through the safety rope along the length direction. At least one end of the insulating sleeve extends through the safety rope.

In one example, the housing includes a main handle. The main handle is disposed on the upper side of the housing. The power insertion interface is disposed on the left side of the main handle. The guide plate is disposed on the right side of the main handle.

In one example, the housing further includes a front end surface and a rear end surface. The front end surface is formed with a front port for the guide plate to extend out. The rear end surface is opposite to the front end surface. In the front and rear direction, the power insertion interface is disposed between the front end surface and the rear end surface.

In one example, the power insertion interface is formed with a connection port opened rearward. Moreover, the second end of the power cord is inserted in the power insertion interface through the connection port.

In one example, the ratio of the weight of the main machine to the length of the portion of the guide plate extending out of the housing is greater than or equal to 8.5 kg/m and less than or equal to 13 kg/m.

In one example, the ratio of the output power of the motor to the weight of the main machine is greater than or equal to 250 W/kg and less than or equal to 800 W/kg.

In the chainsaw provided by the present application, the battery pack is separated from the main machine so that a user can operate the chainsaw more easily and conveniently.

DETAILED DESCRIPTION

Figure 1:
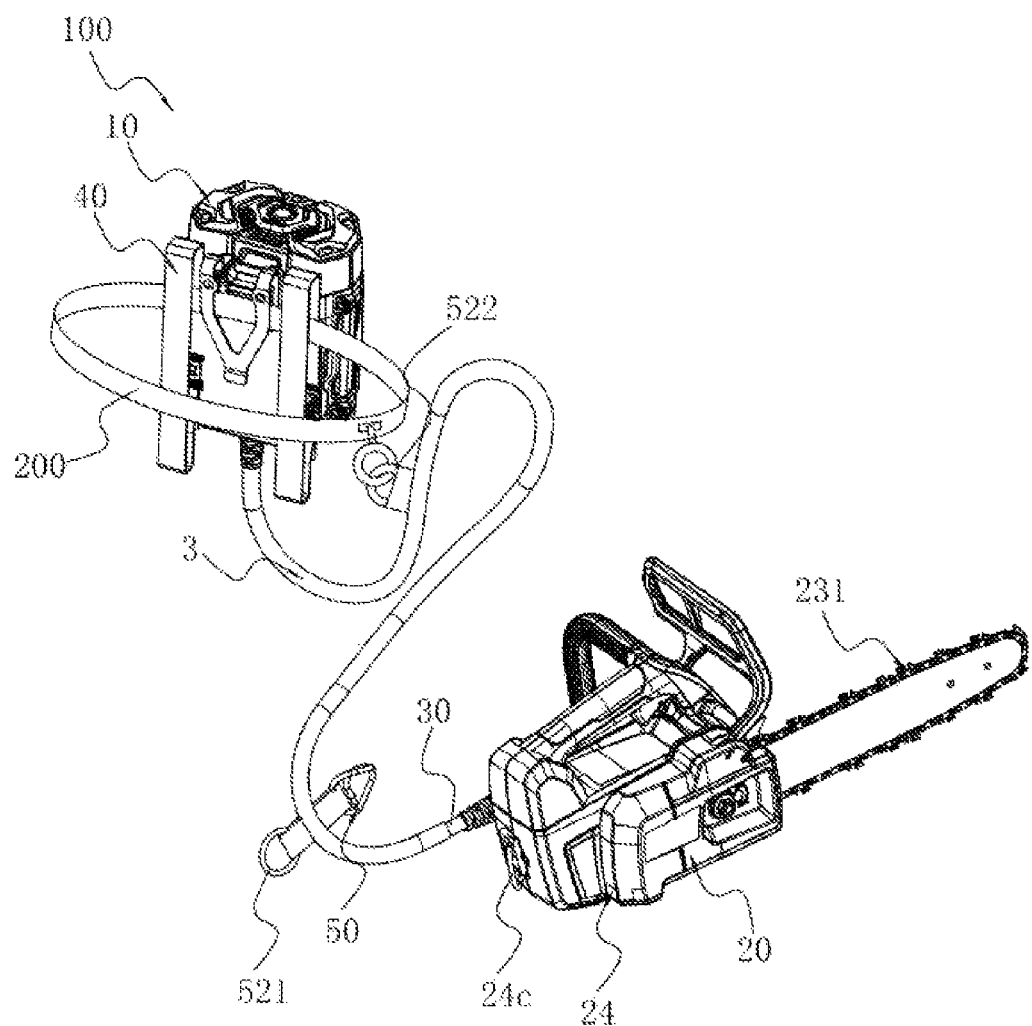
FIG. 1 is a perspective view of a chainsaw according to an example.

A chainsaw 100 shown in FIG. 1 is a power tool. The power tool includes functional components capable of implementing functions of the power tool. For the chainsaw 100, a functional component is a chain 231. The chainsaw 100 implements the function of cutting wood by driving the chain 231 to move.

Figure 4:
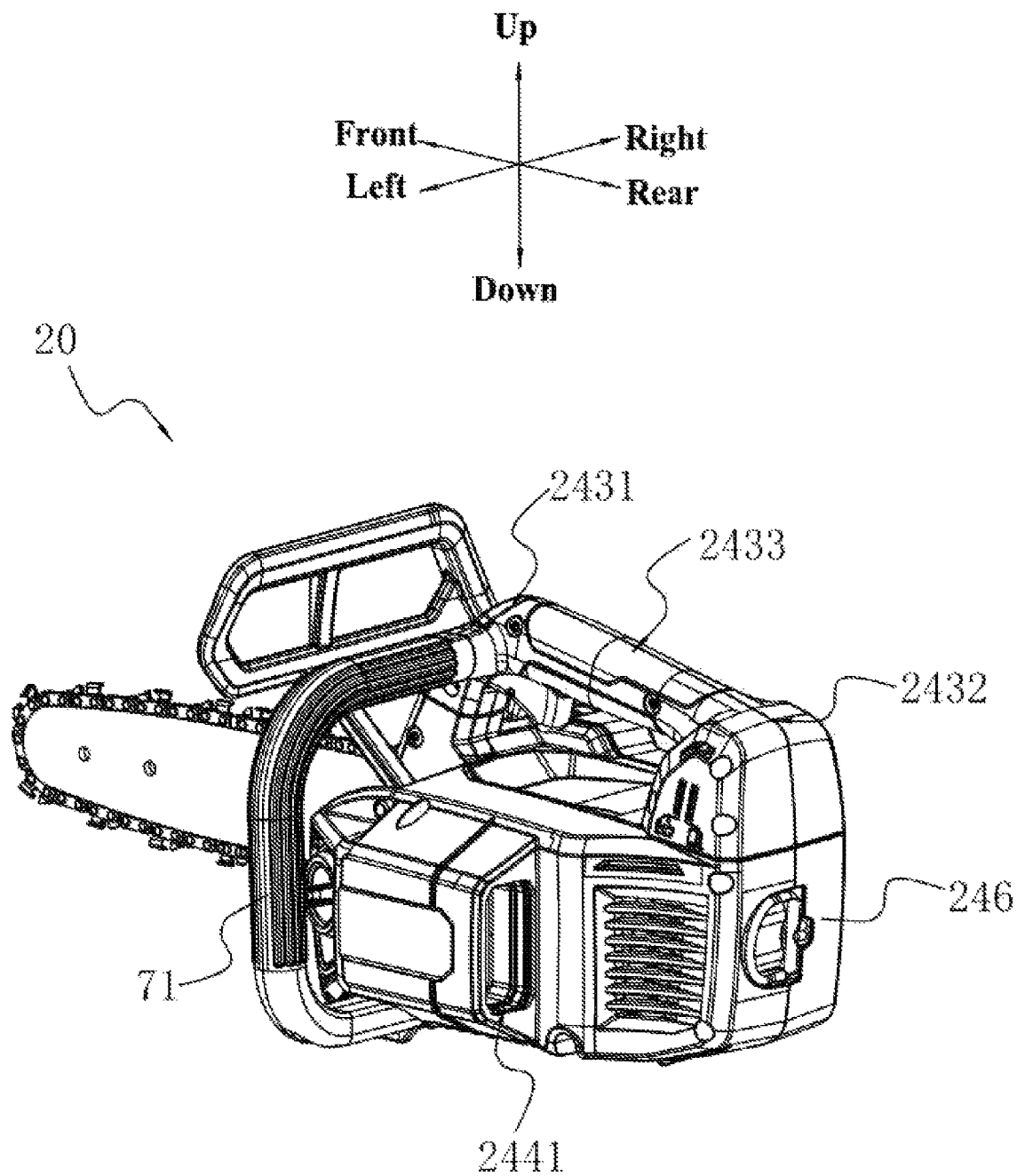
FIG. 4 is a perspective view of a main machine of the chainsaw of FIG. 1.

To clearly illustrate the technical solution of this example, up, down, front, rear, left and right are defined as shown in FIG. 4.

Figure 2:
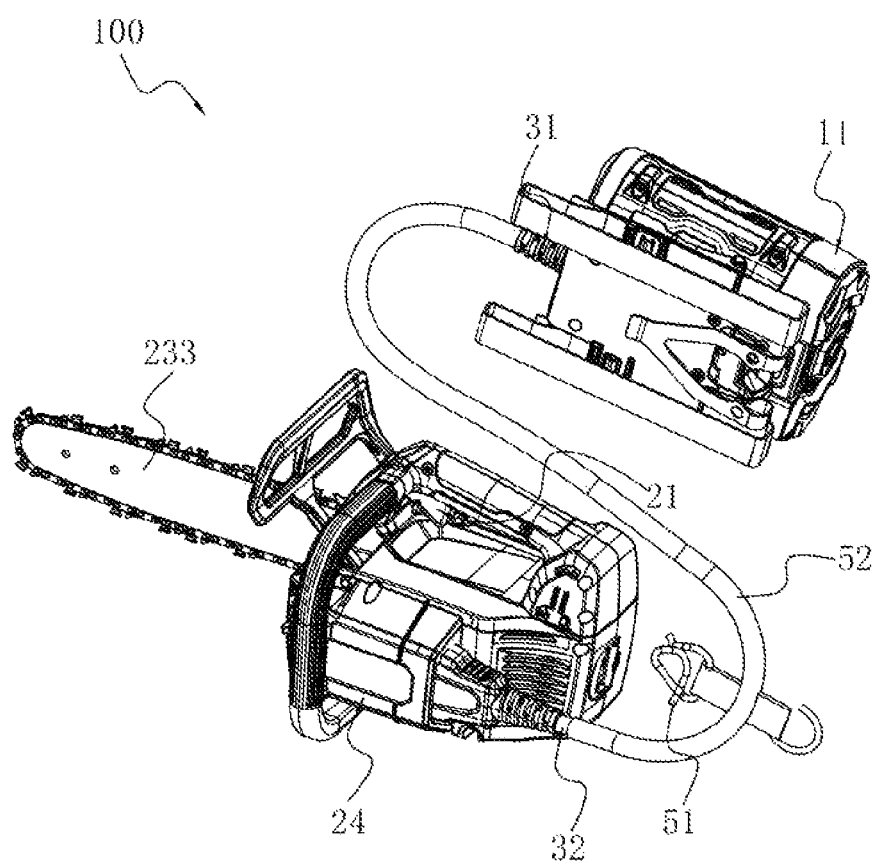
FIG. 2 is a perspective view of the chainsaw of FIG. 1 in another direction.
Figure 3:
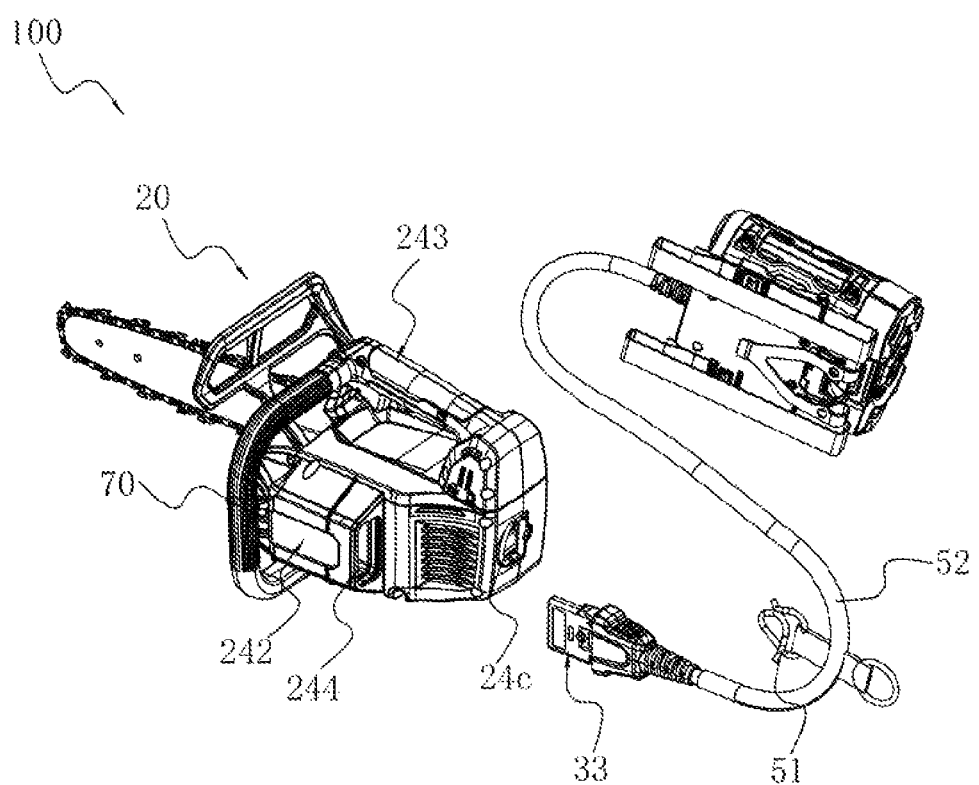
FIG. 3 is a perspective view of the chainsaw of FIG. 1 in which an energy device is separated from a main machine.

Referring to FIGS. 1 to 3, the chainsaw 100 includes an energy device 10, a main machine 20 and a connection assembly 3. The energy device 10 is configured to supply energy to the main machine 20. In this example, the energy device 10 is a battery pack 11. The main machine 20 includes the chain 231 above, and the main machine 20 drives the chain 231 to move to cut wood. The main machine 20 is disposed separately from the battery pack 11, that is, the battery pack 11 is not directly mounted on the outer surface of the main machine 20. In this manner, the weight of the main machine 20 can be reduced so that a user can operate the main machine 20 conveniently and so that the fatigue of the user due to the long-term operation of the main machine 20 can be reduced, thereby improving the work efficiency. The connection assembly 3 is configured to connect the energy device 10 and the main machine 20, thereby transferring the energy output from the energy device 10 to the main machine 20. In this example, the energy device 10 includes a battery pack 11. Moreover, the connection assembly 3 connects the main machine 20 and the battery pack 11 so that the battery pack 11 is electrically connected to the main machine 20. In this example, the connection assembly 3 includes a power cord 30. The main machine 20 is electrically connected to the battery pack 11 through the power cord 30, that is, the battery pack 11 supplies energy to the main machine 20 through the power cord 30. In this example, the connection assembly 3 further includes a mounting base 40. The mounting base 40 is configured as a base for the battery pack 11 to be mounted on. The power cord 30 is electrically connected to the mounting base 40 so that the battery pack 11 is electrically connected to the power cord 30 through the mounting base 40, and then the electrical energy is output to the main machine 20.

The power cord 30 includes a first end 31 configured to electrically connect to the battery pack 11 and a second end 32 configured to electrically connect to the main machine 20. In this example, the first end 31 of the power cord 30 is connected to the mounting base 40 on which the battery pack 11 is mounted to implement the electrical connection between the power cord 30 and the battery pack 11. The first end 31 of the power cord 30 is fixedly connected to the mounting base 40. In other examples, the first end of the power cord may be detachably connected to the mounting base. The second end 32 of the power cord 30 is detachably connected to the main machine 20. The first end 31 of the power cord 30 is connected to a power output interface 33. Correspondingly, a power insertion interface 244 is formed on the main machine 20. The power output interface 33 can be detachably inserted in the power insertion interface 244 to implement the electrical connection between the battery pack 11 and the main machine 20. In this example, the first end 31 of the power cord 30 is detachably connected to the main machine 20 so that when the main machine 20 is subjected to an external force, the main machine 20 can be separated from the power cord 30 and out of the control of a user to avoid harming the user.

In this example, the ratio of the output power of a motor 22 to the weight of the main machine 20 is greater than or equal to 250 W/kg and less than or equal to 800 W/kg. In some other examples, the ratio of the output power of the motor 22 to the weight of the main machine 20 is greater than or equal to 350 W/kg and less than or equal to 600 W/kg. In this manner, the main machine 20 can output higher power while reducing the weight of the whole machine, thereby ensuring the cutting performance. In this example, the weight of the main machine 20 is greater than or equal to 3 kg and less than or equal to 4.5 kg. The output power of the motor 22 is greater than or equal to 1500 W.

As shown in FIGS. 1 to 7, the main machine 20 further includes a switch assembly 21, a guide plate 233, the motor 22 and a housing 24. The switch assembly 21 is operable by a user to start the chainsaw 100. The guide plate 233 is configured to support the chain 231. The motor 22 is configured to drive the chain 231 to move. The housing 24 is formed with an accommodation chamber 241. The motor 22 is at least partially disposed in the accommodation chamber 241. The guide plate 233 is partially disposed in the housing 24 and can extend out of the housing 24. The switch assembly 21 is at least partially disposed in the housing 24. The switch assembly 21 is configured to start the motor 22. Referring to FIGS. 2 to 6, the housing 24 includes a main portion 242, a main handle 243 and the power insertion interface 244 above. The main handle 243 is used for a user to grip. The main portion 242 is formed with an accommodation space for accommodating the motor 22. The power insertion interface 244 is used to cooperate with the power cord 30 to implement electrical connection. To facilitate the operation of a user and to ensure the balance of the main machine 20, the main handle 243 is disposed on the upper side of the housing 24, the power insertion interface 244 is disposed on the left side of the main handle 243, the guide plate 233 is disposed on the right side of the main handle 243, and the motor 22 is located below the main handle 243. In this example, the main handle 243 is disposed on the upper side of the main portion 242. In this manner, the center G of gravity of the main machine 20 is located below the main handle 243. When a user grips the main handle 243 to operate the main machine 20, the smoothness of the main machine 20 during operation is ensured.

The ratio of the weight of the main machine 20 to the length L2 of the portion of the guide plate 233 extending out of the housing 24 is greater than or equal to 6 kg/m and less than or equal to 20 kg/m. In this manner, even when guide plates 233 of different lengths or sizes are mounted, the position of the center G of gravity of the main machine 20 does not change greatly so that the balance performance of the whole machine can be improved. Moreover, in the case where the length L2 of the portion of the guide plate 233 extending out of the housing 24 meets the needs of users, the weight change of the main machine 20 can adapt to the needs of users and can be accepted by users, thereby improving the work efficiency in the case where the work needs are met. In some other examples, the ratio of the weight of the main machine 20 to the length L2 of the portion of the guide plate 233 extending out of the housing 24 is greater than or equal to 8.5 kg/m and less than or equal to 13 kg/m.

The power insertion interface 244 is formed with a connection port 2441 opened rearward. The power output interface 33 of the power cord 30 is inserted in the power insertion interface 244 from the connection port 2441. Exemplarily, an access terminal is disposed inside the connection port 2441, and an output terminal is disposed inside the power output interface 33 of the power cord 30. The battery pack 11 can supply energy to the motor 22 through the output terminal of the power cord 30 and the access terminal inside the connection port 2441.

In this example, the housing 24 includes a front end surface 245 and a rear end surface 246. The motor 22 is disposed between the front end surface 245 and the rear end surface 246. The front end surface 245 is located on the front side of the housing 24. The front end surface 245 is formed with a front port for the guide plate 233 to extend out. The rear end surface 246 is disposed on the rear side of the front end surface 245 and is opposite to the front end surface 245. The power insertion interface 244 is disposed between the front end surface 245 and the rear end surface 246, that is, the power insertion interface 244 is not disposed on the front end surface 245 or the rear end surface 246. In this manner, the size of the main machine 20 in the front and rear direction is small, thereby facilitating the operation of users, and facilitating transportation and storage. Moreover, the power insertion interface 244 is disposed between the front end surface 245 and the rear end surface 246 so that the rear end surface 246 can effectively protect the power insertion interface 244 from being damaged and can also avoid the unstable connection between the power cord 30 and the power insertion interface 244 resulted by foreign objects, such as tree branches scratching the second end 32 of the power cord 30 connected to the power insertion interface 244.

In the front and rear direction, the distance L between the power insertion interface 244 and the center G of gravity is less than or equal to 100 mm. In the front and rear direction, the distance L between the power insertion interface 244 and the center G of gravity is less than or equal to 80 mm. In this manner, the power insertion interface 244 is disposed closer to the center G of gravity so that when the power cord 30 is connected to the main machine 20, the power cord 30 has little influence on the balance of the main machine 20, thereby facilitating operation of users and improving the work efficiency. Moreover, in this example, the center G of gravity is disposed in a preset distance range on the front side of the power insertion interface 244 so that when the power insertion interface 244 is connected to the power cord 30, the main machine 20 can be slightly tilted, thereby facilitating stable operation of the main machine 20 by a user.

The guide plate 233 extends in a first plane P1. The rear end surface 246 at least partially extends in a second plane P2. The first plane P1 is substantially perpendicular to the second plane P2. The distance L1 between the power insertion interface 244 and the second plane P2 is greater than or equal to 80 mm and less than or equal to 100 mm.

The main handle 243 includes a front end portion 2431, a rear end portion 2432 and a main grip 2433. In the front and rear direction, the motor 22 is disposed between the front end portion 2431 and the rear end portion 2432. The main handle 243 is connected to the main portion 242. The front end portion 2431 is fixedly connected to or integrally formed with the main portion 242. The rear end portion 2432 is fixedly connected to or integrally formed with the main portion 242. The power insertion interface 244 is disposed between the front end portion 2431 and the rear end portion 2432 so that the distance between the power insertion interface 244 and the center G of gravity is small. The main grip 2433 is the main grip area for a user. The main grip 2433 is disposed between the front end portion 2431 and the rear end portion 2432. The power insertion interface 244 is disposed directly below the main grip 2433 so that the smoothness of the operation can be improved.

Figure 5:
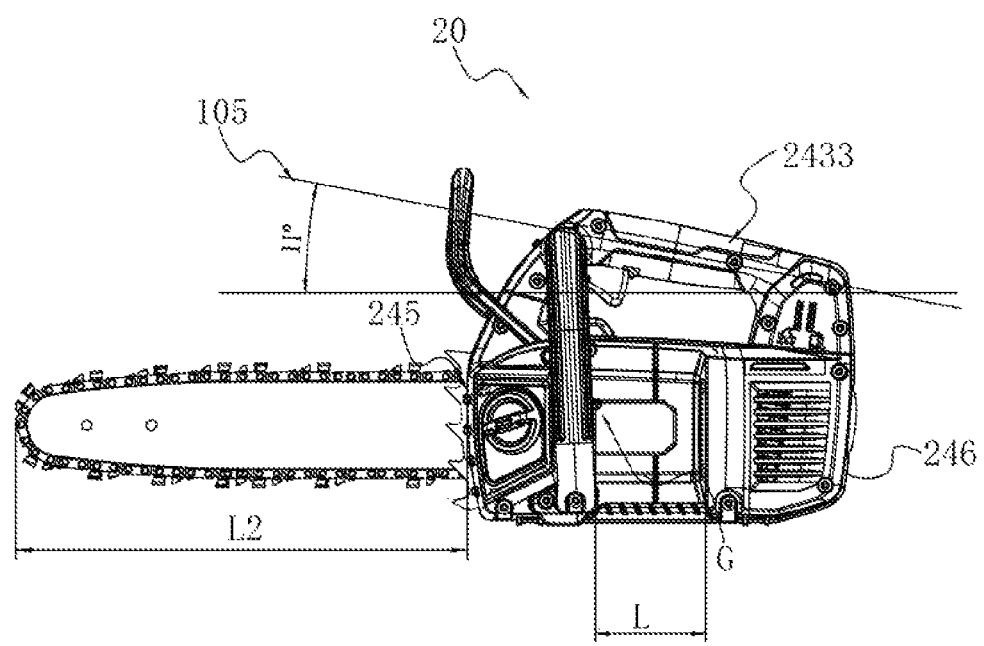
FIG. 5 is a plan view of the main machine of FIG. 4.
Figure 7:
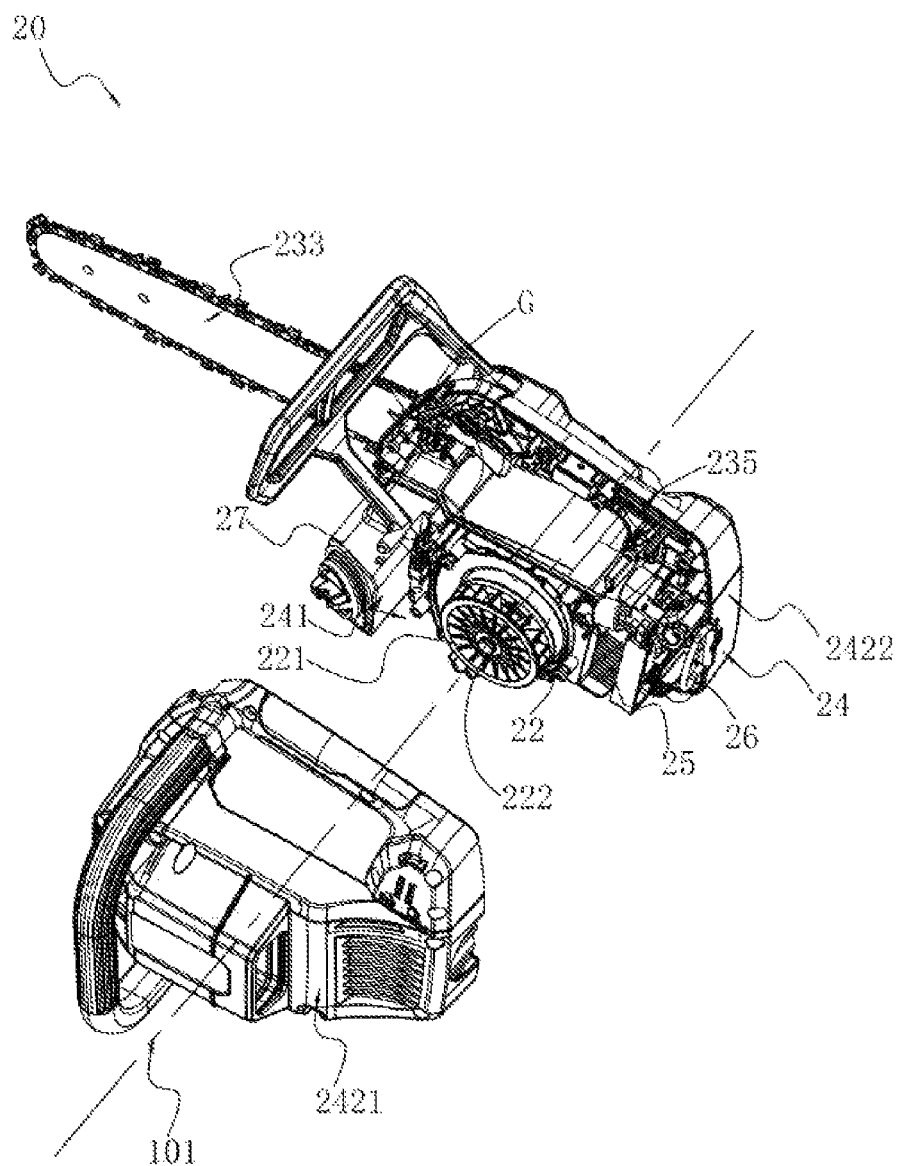
FIG. 7 is a perspective view of the main machine of FIG. 4 in which a left housing portion is separated.
Figure 8:
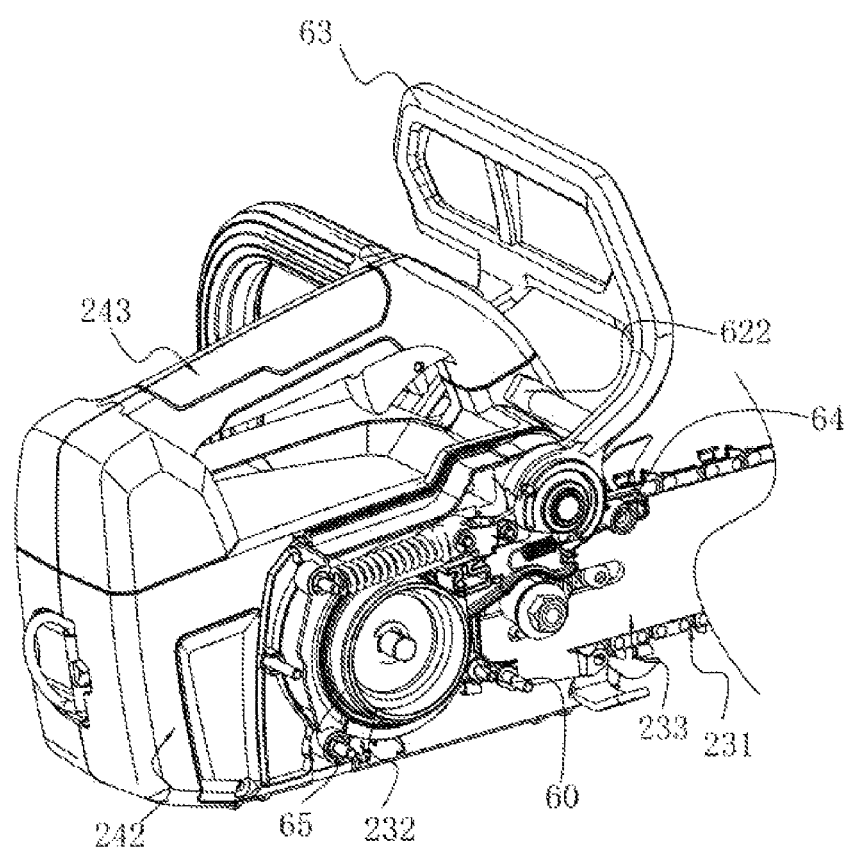
FIG. 8 is a perspective view of the main machine of FIG. 4 in which a brake cover plate is opened.

Referring to FIGS. 5, 7 and 8, the main machine 20 further includes a fan 221, a chainwheel 232, a heat dissipation substrate 25, a circuit board 26 and an oiler 27. The fan 221 is disposed in the accommodation chamber 241. Moreover, the fan 221 is connected to the motor 22 and can rotate with the operation of the motor 22. The chainwheel 232 is connected to the chain 231 and is configured to drive the chain 231 to move. The heat dissipation substrate 25 is configured to guide the flow of a heat dissipation airflow generated when the fan 221 rotates. The circuit board 26 is disposed in the housing 24 and on the rear side of the motor 22. The heat dissipation substrate 25 is in contact with the circuit board 26 so that heat generated by the circuit board 26 during working can be transferred directly to the heat dissipation substrate 25. Then the heat is carried away by the heat dissipation airflow. The oiler 27 is used to lubricate the guide plate 233 and the chain 231. The oiler 27 is at least partially disposed in the accommodation chamber 241. In the front and rear direction, the motor 22 is disposed between the heat dissipation substrate 25 and the oiler 27, and the motor 22 is disposed between the circuit board 26 and the oiler 27. In this manner, the center G of gravity of the main machine 20 can be disposed closer to the motor 22 and the oiler 27. The weight of the motor 22 and the oiler 27 is relatively large with respect to that of other parts so that the balance of the main machine 20 is improved and so that the positions of other parts excluding the motor 22 are easily arranged. In this example, the center G of gravity is disposed between the oiler 27 and the motor 22 in the front and rear direction. In this manner, the oiler 27 and the motor 22 are each closer to the center G of gravity so that the amount of oil stored in the oiler 27 has less influence on the change of the position of the center G of gravity.

Referring to FIGS. 5 to 8, the motor 22 includes a motor shaft 222. The motor shaft 222 can rotate around a first axis 101. Moreover, the motor shaft 222 drives the chainwheel 232 to drive the chain 231 to move. The fan 221 is mounted on the motor shaft 222. The motor shaft 222 drives the fan 221 to rotate. The first axis 101 of the motor shaft 222 is perpendicular to the first plane P1. The guide plate 233 extends out of the housing 24. That is, the motor 22 is disposed along the left and right direction. In order that the position of the power insertion interface 244 is closer to the center G of gravity of the main machine 20, and the smoothness of the main machine 20 during operation is ensured, the power insertion interface 244 may be disposed at one end of the motor 22 along the direction of the first axis 101. To facilitate the fan 221 to dissipate the heat at the power insertion interface 244, the power insertion interface 244 is disposed closer to the fan 221. Optionally, the power insertion interface 244 may be disposed at one end of the fan 221.

Figure 9:
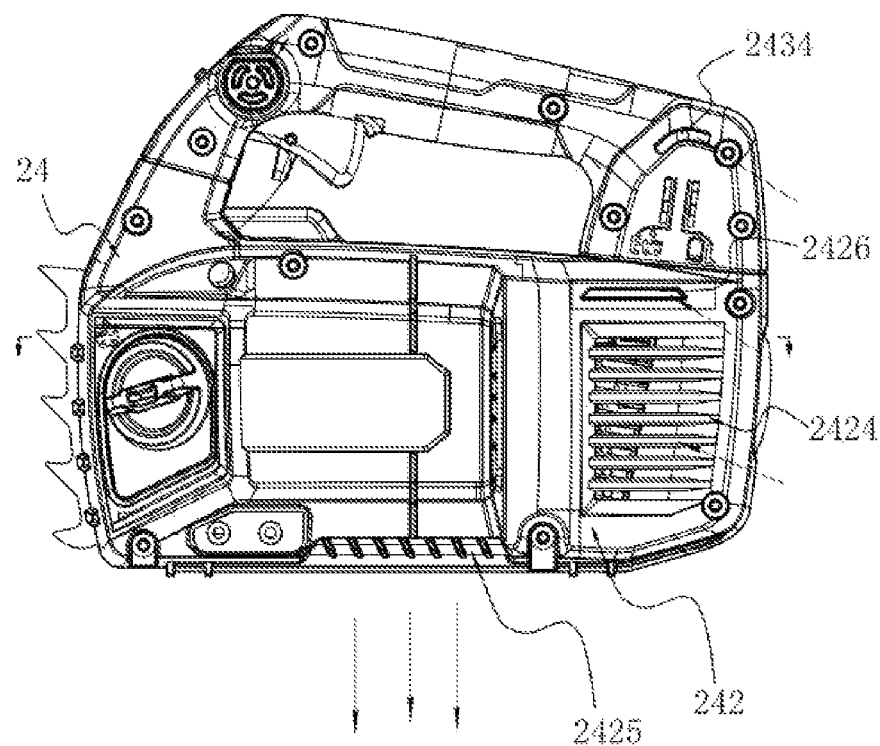
FIG. 9 is a plan view of the main machine of FIG. 4 in which a guide plate is detached.
Figure 10:
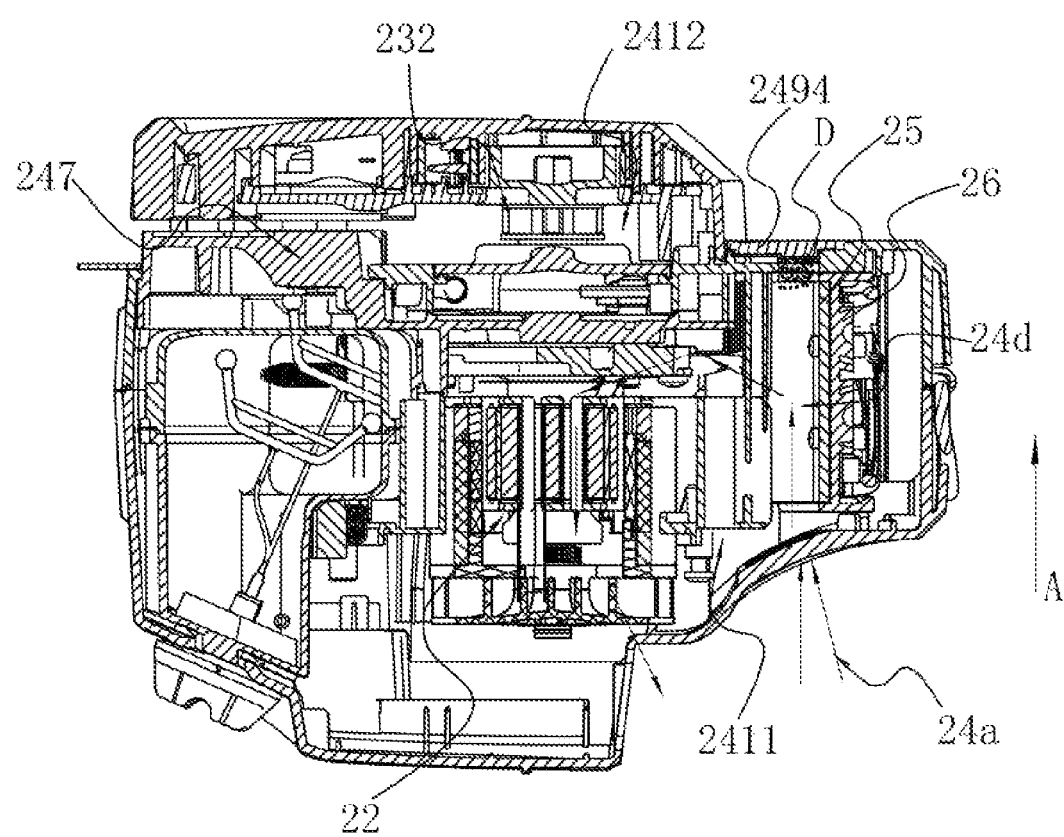
FIG. 10 is a sectional view of the structure of FIG. 9.
Figure 11:
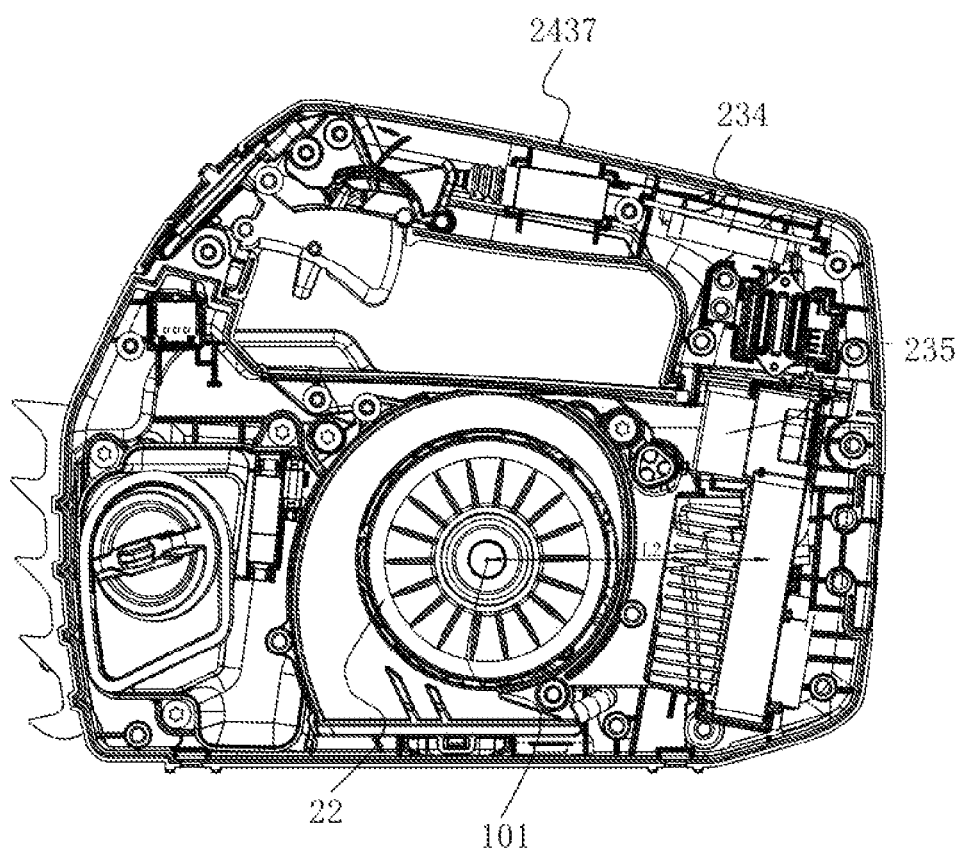
FIG. 11 is a plan view of the structure of FIG. 9 in which a left housing portion is detached.
Figure 12:
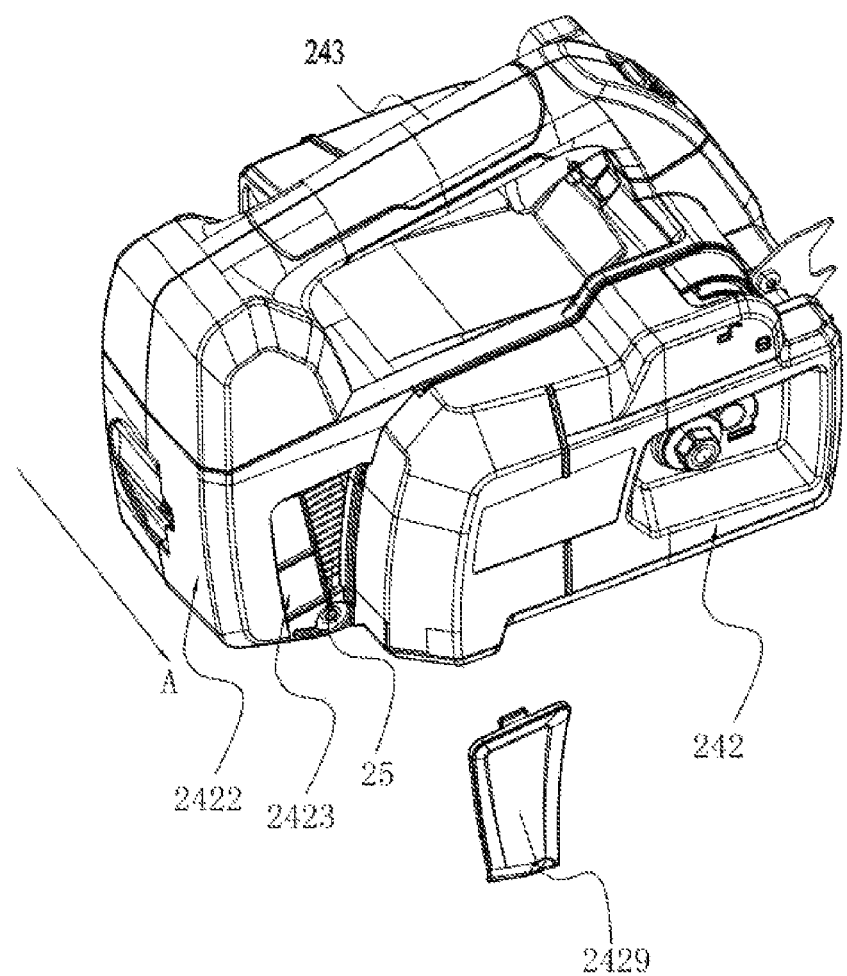
FIG. 12 is a perspective view of the structure of FIG. 9 in which a cover plate is opened.
Figure 13:
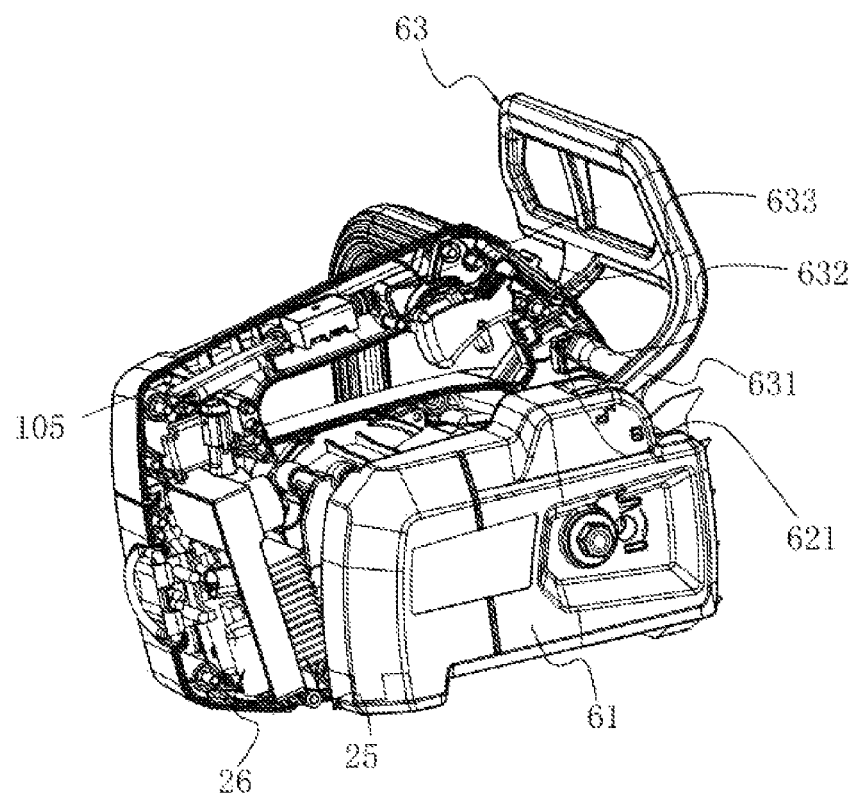
FIG. 13 is a perspective view of the structure of FIG. 9 in which a right housing portion is detached.

As shown in FIGS. 7, 9 and 10, the main machine 20 further includes a bracket 247. The bracket 247 is configured to support the motor 22. Moreover, the bracket 247 is disposed in the main portion 242. The bracket 247 separates the accommodation chamber 241 into a left space 2411 and a right space 2412. The motor shaft 222 of the motor 22 extends from the left space 2411 to the right space 2412. The stator of the motor 22 is located in the left space 2411. The chainwheel 232 is disposed in the right space 2412. The oiler 27, the fan 221 and the circuit board 26 are disposed in the left space 2411. In this manner, the main machine 20 has good balance in the left and right direction.

The housing 24 is provided with a main air inlet 2424 for airflow to flow into the accommodation cavity 241 and an air outlet 2425 for airflow to flow out. When the fan 221 rotates, a first heat dissipation airflow 24a flowing from the main air inlet 2424 into the housing 24 and then flowing out from the air outlet 2425 is generated in the housing 24. The housing 24 is provided with a first airflow channel 24d. The first airflow channel 24d is configured to guide the flow of the first heat dissipation airflow 24a to implement the heat dissipation of the motor 22 and the circuit board 26. The first airflow channel 24d is formed by the bracket 247 and the sidewall of the housing 24. The heat dissipation substrate 25 in the left space 2411 guides the first heat dissipation airflow 24a to flow in a first direction A. The first heat dissipation airflow 24a is restricted by the sidewall of the bracket 247. The first heat dissipation airflow 24a flows through the stator of the motor 22 and is finally discharged from the air outlet 2425 to implement the heat dissipation of the motor 22 and the circuit board 26. The fan 221 is a centrifugal fan. The path through which the first heat dissipation airflow 24a flows is located in the left space 2411. The first heat dissipation airflow 24a does not extend through the right space 2412. The chainwheel 232 is disposed in the right space 2412. Moreover, the chain 231 and the guide plate 233 are partially disposed in the right space 2412. In this manner, dust such as wood chips or ash may be generated in the right space 2412. In this example, the flow path of the first heat dissipation airflow 24a is disposed in the left space 2411. In this manner, on the one hand, the first heat dissipation airflow 24a does not absorb the dust in the right space 2412 during the flow. On the other hand, the first heat dissipation airflow 24a can form an airflow barrier in the housing 24 during the flow. The airflow barrier can hinder the dust in the right space 2412, thereby prolonging the service life of the chainsaw 100.

The main air inlet 2424 is disposed on the left side of the main handle 243. The guide plate 233, the chainwheel 232 and the chain 231 are disposed on the right side of the main handle 243. When a user operates the main machine 20 to cut a branch, ash and wood chips are generally formed on the left side of the main handle 243, and the main air inlet 2424 is disposed on the right side of the main handle 243 so that ash and wood chips can be reduced from the main air inlet 2424 into the housing 24.

The main air inlet 2424 is disposed closer to the circuit board 26 and the heat dissipation substrate 25. To prevent the wind discharged from the air outlet 2425 from affecting the operation of a user, the air outlet 2425 is opened downward. Exemplarily, the main portion 242 includes a left housing portion 2421 and a right housing portion 2422. The main air inlet 2424 and the air outlet 2425 are disposed on the left housing portion 2421. In this example, the power insertion interface 244 is disposed above the air outlet 2425 so that ash from the air outlet 2425 can be effectively prevented from entering the power insertion interface 244.

As shown in FIGS. 9 to 12, the right housing portion 2422 has an opening 2423 disposed opposite to the main air inlet 2424. The heat dissipation substrate 25 includes a plurality of fins. A guide channel capable of guiding airflow is formed between two adjacent fins. The airflow from the main air inlet 2424 into the housing 24 carries dust D. The dust D accumulates between the fins or falls on the bottom of the housing 24, affecting the operation of the main machine 20.

In this example, the main air inlet 2424 is disposed at one end of the guide channel, and the opening 2423 is disposed at another end of the guide channel. The guide channel guides the first heat dissipation airflow 24a to flow along the first direction A. After flowing along the first direction A for a period of time, the first heat dissipation airflow 24a turns to flow along a second direction under the action of the first airflow channel 24d. The turned first heat dissipation airflow 24a flows to the motor 22, and the dust D contained in the first heat dissipation airflow 24a continues to move along the first direction A under the action of inertia so that a portion of the dust D is separated from the first heat dissipation airflow 24a, thereby reducing the dust D flowing through the motor 22 and prolonging the service life of the motor 22. The opening 2423 is disposed in the first direction A so that the dust D can accumulate near the opening 2423. The housing 24 further includes a cover plate 2429 for sealing the opening 2423. The cover plate 2429 is detachably connected to the housing 24. In this example, the main air inlet 2424 is disposed on the left housing portion 2421. The opening 2423 and the cover plate 2429 are disposed on the right housing portion 2422. In this example, the cover plate 2429 is connected to the housing 24 by screws so that the cover plate 2429 can be prevented from being accidentally separated from the housing 24.

When the main machine 20 is working, the cover plate 2429 closes the opening 2423, thereby preventing the first heat dissipation airflow 24a from flowing out of the opening 2423. In this manner, when the main machine 20 is working, the first heat dissipation airflow 24a enters the housing 24 from the main air inlet 2424. Under the guide of the heat dissipation substrate 25, the first heat dissipation airflow 24a first flows along the first direction A. After the first heat dissipation airflow 24a flows out of the heat dissipation substrate 25, the first airflow channel 24d guides the first heat dissipation airflow 24a to turn to flow to the motor 22. At this time, the dust D contained in the first heat dissipation airflow 24a continues to flow along the first direction A under the action of inertia to accumulate at the opening 2423. Moreover, after flowing through the motor 22, the first heat dissipation airflow 24a flows out from the air outlet 2425 to the outside of the housing 24. After the main machine 20 works for a period of time, a lot of dust D accumulates at the opening 2423. At the same time, a lot of dust D adheres to the heat dissipation substrate 25. At this time, a user can remove the cover plate 2429, and the opening 2423 formed in the housing is opened to the right. The user can clean the dust D at the opening 2423 and on the heat dissipation substrate 25 by an air blow gun or through other methods.

In this example, the opening 2423 and the main air inlet 2424 are disposed at two ends of the heat dissipation substrate 25 respectively.

In this example, the main air inlet 2424 is disposed on the left side of the housing 24, and the main air inlet 2424 guides the first heat dissipation airflow 24a to enter the housing 24 from left to right. The air outlet 2425 is disposed on the lower side of the housing 24. The air outlet 2425 guides the first heat dissipation airflow 24a to flow out of the housing 24 from top to bottom. The flow direction of the first heat dissipation airflow 24a when entering the housing 24 from the main air inlet 2424 is perpendicular to the flow direction of the first heat dissipation airflow 24a when flowing out from the air outlet 2425.

As shown in FIGS. 8 to 13, the chainsaw 100 further includes a brake assembly 60 and a brake cover plate 61. The brake assembly 60 is used for a user to brake the main machine 20 when the user works at height, thereby protecting the safety of the user. The brake cover plate 61 is detachably connected to the main portion 242. A space for accommodating the brake assembly 60 is formed by the brake cover plate 61 and the main portion 242. The brake cover plate 61 is connected to the main portion 242 by screws. When the brake cover plate 61 is detached, the brake assembly 60 is exposed so that the brake assembly 60 can be maintained and so that ash on the brake assembly 60 can be cleaned. A forwardly opened opening is formed between the brake cover plate 61 and the main portion 242. The opening is used for the guide plate 233 to extend out of the housing 24.

The opening 2423 is disposed on the rear side of the brake assembly 60, and the cover plate 2429 is disposed on the rear side of the brake cover plate 61 so that the dust D does not flow back to the brake assembly 60.

A fuse 234 is disposed in the housing 24 and is disposed in the main handle 243. The fuse 234 is used to protect a circuit from large currents in the circuit that damage components in the main machine 20. When the main machine 20 is in operation, the fuse 234 generates a large amount of heat which may easily cause aging of the housing 24 and affect the use of the main machine 20. A first auxiliary air inlet 2434 is formed in the main handle 243. Moreover, the first auxiliary air inlet 2434 is opened near the fuse 234. Exemplarily, when the fan 221 rotates, a second heat dissipation airflow enters the main handle 243 from the first auxiliary air inlet 2434 and flows through the fuse 234. The rotation of the fan 221 can generate a negative pressure. The negative pressure sucks the second heat dissipation airflow into the left space 2411. The second heat dissipation airflow enters the motor 22 along the sidewall of the bracket 247 and is finally discharged from the air outlet 2425.

The housing 24 further includes a capacitor 235. The capacitor 235 is disposed in the main portion 242. The capacitor 235 generates a large amount of heat when the main machine 20 is in operation, thereby easily causing rapid aging of the housing 24. A second auxiliary air inlet 2426 is formed in the left housing portion 2421. Moreover, the second auxiliary air inlet 2426 is opened near the capacitor 235. Exemplarily, when the fan 221 rotates, a third heat dissipation airflow enters the main portion 242 from the second auxiliary air inlet 2426 and flows through the capacitor 235. The rotation of the fan 221 can generate a negative pressure. The negative pressure sucks the third heat dissipation airflow into the motor 22. Finally, the third heat dissipation airflow is discharged from the air outlet 2425. The first heat dissipation airflow 24a, the second heat dissipation airflow, and the third heat dissipation airflow can dissipate heat to the motor 22, thereby prolonging the service life of the motor 22.

In this example, the brake assembly 60 includes a brake plate 63, a signal assembly, a linkage assembly 64 and a brake band 65. The brake band 65 includes a Hall component 621 and a magnetic member 622. The brake plate 63 is rotatably connected to the housing 24. Moreover, the brake plate 63 is used for a user to operate. The signal assembly is used to implement the electronic brake of the motor 22. The Hall component 621 is located inside the housing 24, and the magnetic member 622 is mounted on the brake plate 63. By rotating the brake plate 63, the magnetic field around the magnetic member 622 changes, causing the Hall component 621 to generate a signal, thereby performing an electronic brake on the motor 22 through a control circuit. The linkage assembly 64 is separately connected to the brake plate 63 and the brake band 65 and is used to implement power transmission between the brake plate 63 and the brake band 65. When the brake plate 63 rotates, the linkage assembly 64 drives the brake band 65 to tension to mechanically brake the chainwheel 232. In this example, when a user rotates the brake plate 63, on the one hand, the signal assembly performs an electronic brake on the motor 22. Moreover, on the other hand, the brake band 65 performs a mechanical brake on the chainwheel 232. Thus, the safety performance of the main machine 20 can be improved.

The brake plate 63 has three legs which are a first brake leg 631, a second brake leg 632 and a third brake leg 633, respectively. The first brake leg 631 is connected to the linkage assembly 64. When the brake plate 631 rotates relative to the housing 24, the first brake leg 631 drives the linkage assembly 64 to move. Moreover, the linkage assembly 64 drives the brake band 65 to perform a mechanical brake on the chainwheel 232. The second brake leg 632 is connected to the signal assembly. The magnetic member 622 is fixedly connected to the second brake leg 632. The Hall component 621 is mounted on the housing 24. The position of the magnetic member 622 relative to the position of the Hall component 621 changes when the brake plate 622 rotates relative to the housing 24, thereby driving the Hall component 621 to send an electrical signal to the control circuit. Thus, the control circuit performs an electronical brake on the motor 22. In this example, the electronic brake performed by the signal assembly is earlier than the mechanical brake performed by the brake band 65. That is, the control circuit is already performing the electronic brake on the motor 22 before the brake band 65 brakes the chainwheel 232.

The third brake leg 633 is used to rotatably mount the brake plate 63 to the housing 24. The first brake leg 631 and the second brake leg 632 are disposed on the right side of the main handle 243. The third brake leg 633 is disposed on the left side of the main handle 243. The Hall component 621 is fixedly disposed in the main handle 243. As another implementation, the Hall component is fixedly disposed in the main portion.

Figure 14:
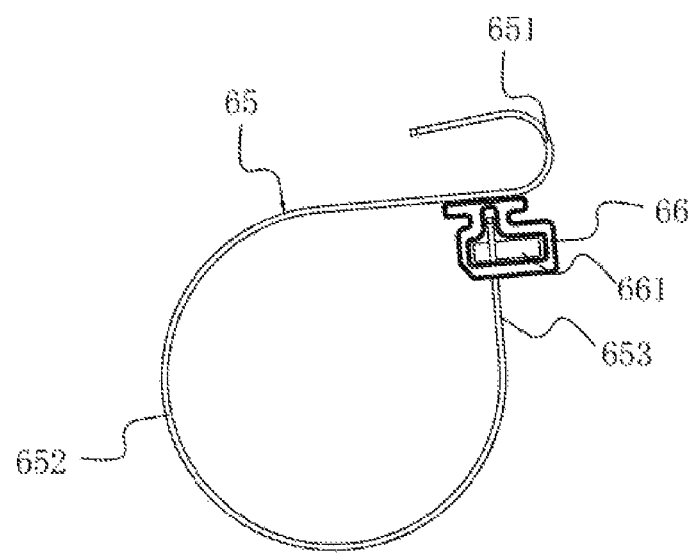
FIG. 14 is a plan view of a brake band of FIG. 13.
Figure 15:
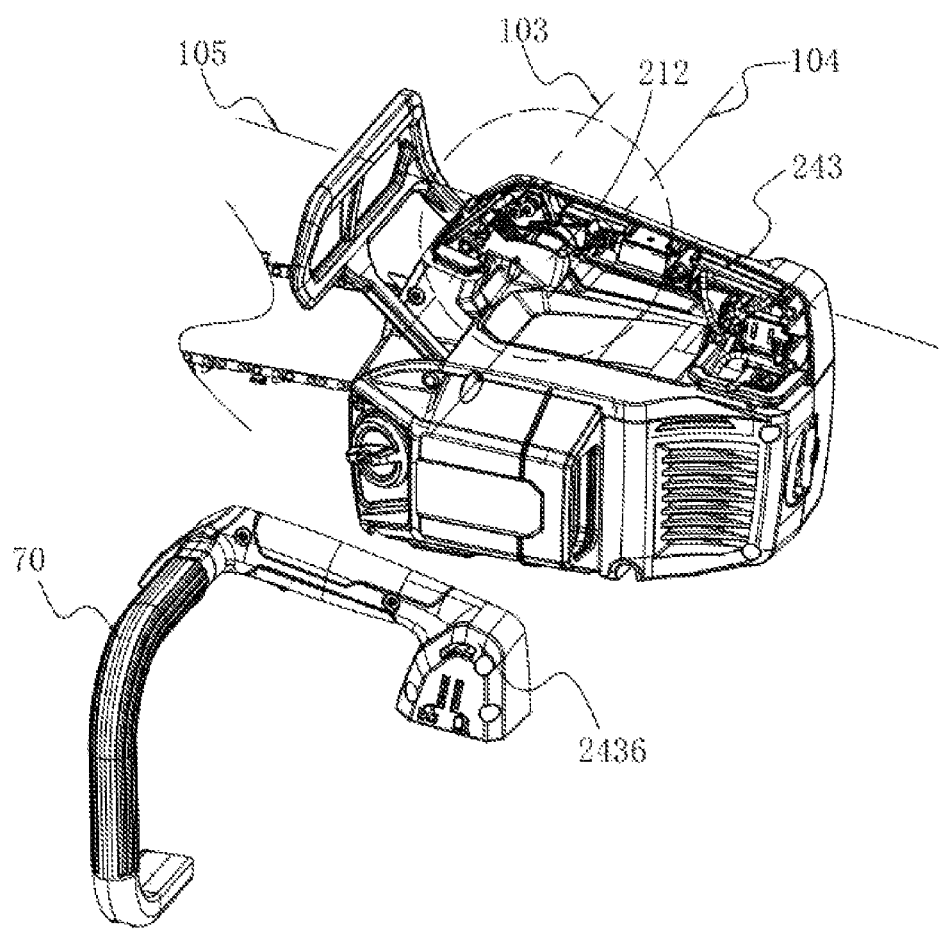
FIG. 15 is a perspective view of the main machine of FIG. 4 in which a main handle portion is separated.
Figure 16:
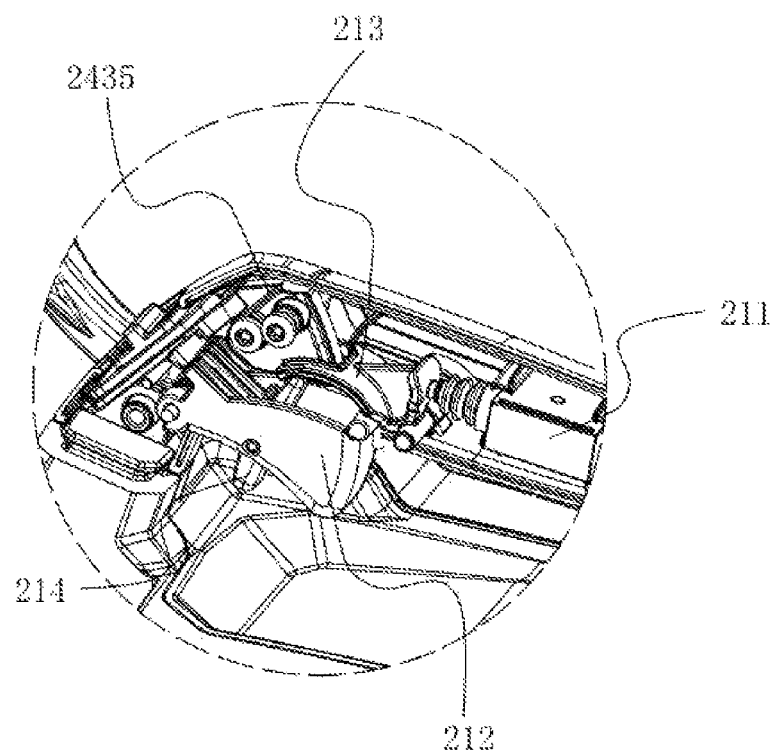
FIG. 16 is an enlarged view of part of the structure of FIG. 15.
Figure 17:
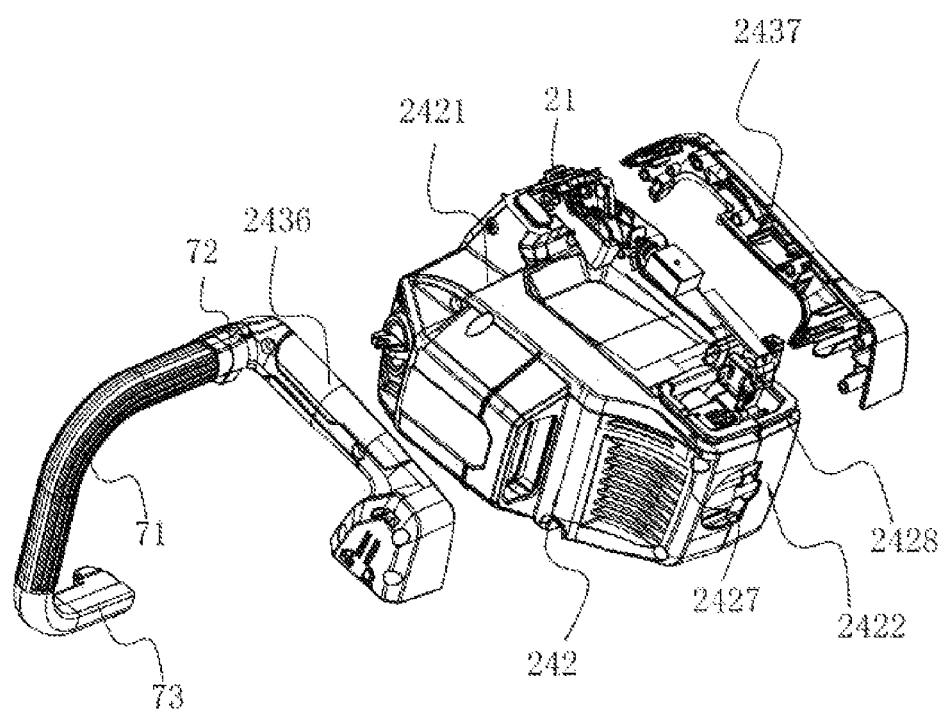
FIG. 17 is a perspective view of the structure of FIG. 9 in which a main handle and an auxiliary handle are separated.
Figure 18:
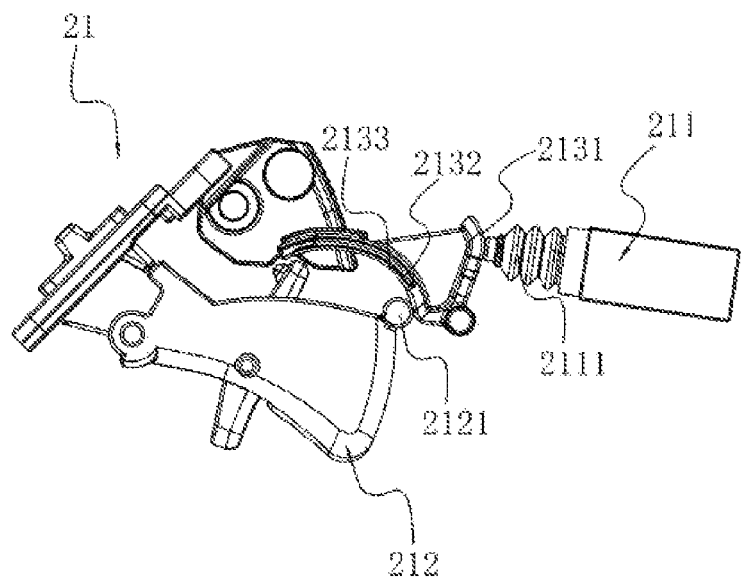
FIG. 18 is a plan view of a switch assembly of FIG. 17.

As shown in FIG. 14, the brake belt 65 includes a first segment 651, a brake segment 652 and a second segment 653. The first segment 651 is connected to the brake plate 63 by the linkage assembly 64. The brake segment 652 surrounds the chainwheel 232 for locking the rotation of the chainwheel 232. The second segment 653 is connected to the housing 24, thereby mounting the brake band 65 to the housing 24. The brake segment 652 is an arc. The first segment 651 is disposed at one end of the arc. The second segment 653 is disposed at another end of the arc. The first segment 651 first extends from one end of the arc along a straight line and then bends 180 degrees to form a curved hook, thereby facilitating the connection of the linkage assembly 64 with the first segment 651. The second segment 653 extends from the brake segment 652 along a straight line. Moreover, the second segment 653 no longer bends, that is, the second segment 653 is completely a straight segment. In this example, the second segment 653 extends from the another end of the arc along the up and down direction to form a straight segment so that the brake band 65 can be prevented from being bent multiple times to affect the structural strength and space is saved. The brake assembly 60 further includes a limiting member 66 for preventing the free movement of the second segment 653. The limiting member 66 is fixedly connected to the housing 24. Moreover, the limiting member 66 is connected to the second segment 653 by a pin 661. In an example, the limiting member 66 is mounted on the housing 24, and the limiting member 66 is formed with an insertion hole. The second segment 653 extends into the inside of the limiting member 66 through the insertion hole. Moreover, a pin 661 is disposed inside the limiting member 66. The pin 661 extends through the mounting hole formed in the second segment 653 to limit the second segment 653 in the limiting member 66. The housing 24 is a plastic member. If the second segment 653 of the brake band 65 is mounted directly through the housing 24, the housing 24 is prone to wear and thus, the mounting of the brake band 65 is unstable. In this example, the limiting member 66 and the pin 661 are metal members so that the wear to the housing 24 can be reduced and so that the stability of the mounting of the brake band 65 can be enhanced.

As shown in FIGS. 15 to 18, the switch assembly 21 is mounted on the main handle 243. The switch assembly 21 includes a trigger switch 211 and a trigger 212. The trigger switch 211 is electrically connected to the motor 22. The trigger 212 is used for operation by a user. The main handle 243 is formed around a handle space 2435. The trigger 212 is rotatably connected to the main handle 243 for operation by a user. The trigger switch 211 is disposed in the handle space 2435. When a user operates the trigger 212, the trigger 212 rotates relative to the housing 24 around a first rotation axis 103 and rotates from the initial position to a start position to trigger the trigger switch 211 to start the motor 22. After the user releases the trigger 212, the trigger 212 rotates from the start position to a stop position. The trigger switch 211 is opened, and the motor 22 is stopped. The start position in the present application refers to the position at which the trigger switch 211 is closed during the rotation of the trigger 212 to implement the start of the motor 22, that is, as long as the trigger 212 can close the trigger switch 211 during the rotation, the position can be the start position. The position at which the trigger switch 211 can be opened during the rotation of the trigger 212 can be the stop position.

The switch assembly 21 further includes a rotating member 213. The rotating member 213 is rotatably disposed in the handle space 2435. The rotating member 213 can be driven by the trigger 212 to trigger the closing of the trigger switch 211. Exemplarily, when the trigger 212 rotates around the first rotation axis 103, the trigger 212 drives the rotating member 213 to rotate around a second rotation axis 104 to trigger the trigger switch 211, thereby starting the chainsaw 100. In this example, the rotating member 213 includes a contact portion 2132 and a drive portion 2131. The contact portion 2132 is in contact with the trigger 212. The trigger 212 includes a protrusion portion 2121 which cooperates with the contact portion 2132. The drive portion 2131 is used to contact the trigger switch 211 to trigger the trigger switch 211. The trigger switch 211 includes a push rod 2111 that can be triggered. The push rod 2111 extends substantially along the direction of a center line 105. When a user operates the trigger 212, the protrusion portion 2121 of the trigger 212 pushes the rotating member 213 to rotate around the second rotation axis 104. The drive portion 2131 of the rotating member 213 triggers the push rod 2111 during the rotation. Then the push rod 2111 moves rearward along the center line 105 to close the trigger switch 211, thereby starting the motor 22. The trigger switch 211 may be a limit switch.

The sliding stroke of the push rod 2111 is related to the rotational speed of the motor 22, that is, the longer the push rod 2111 moves rearward along the direction of the center line 105, the faster the motor 22 is. In this example, the sliding distance of the push rod 2111 is related to the rotational angle of the trigger 212, that is, the greater the rotational angle of the trigger 212, the longer the push rod 2111 moves rearward along the direction of the center line 105. To facilitate the trigger 212 to control the rotational speed of the motor 22, a contact surface 2133 is formed on the contact portion 2132 contacting the protrusion portion 2121 of the trigger 212. The contact surface 2133 is set as a curve surface. In this manner, the ratio of the rotational angle of the trigger 212 to the sliding distance of the push rod 2111 is a constant K. Alternatively, in other examples, the ratio of the rotational angle of the trigger 212 to the sliding distance of the push rod 2111 is greater than or equal to 0.9K and less than or equal to 1.1K.

The switch assembly 21 has a lock switch 214 operated in such a manner that a user operates the lock switch 214 to unlock before operating the trigger 212. In this manner, the chainsaw 100 can be prevented from being incorrectly started, thereby ensuring the safety of the user.

The main handle 243 is detachably connected to the main portion 242 to facilitate the maintenance and replacement of electronic components and mechanical parts inside the main handle 243. Detachable means that the main handle 243 is separated from the main portion 242 without breaking the original structure of the main handle 243 or the main portion 242. For example, the main handle 243 and the main portion 242 constitute an engagement connection, a threaded connection, a screw connection or the like. The main handle 243 includes a left handle portion 2436 and a right handle portion 2437. The left handle portion 2436 is detachably connected to the right handle portion 2437, that is, the left handle portion 2436 and the right handle portion 2437 may be connected by an engagement connection, a threaded connection, a screw connection or the like. Thus, a user can separately detach the left handle portion 2436 and the right handle portion 2437 from the main portion 242.

In this example, a left groove 2427 and a right groove 2428 are formed on the main portion 242. The left groove 2427 is for a portion of the left handle portion 2436 to insert into from the left side. The right groove 2428 is for a portion of the right handle portion 2437 to insert into from the right side. The insertion of the left handle portion 2436 into the left groove 2427 enables the left handle portion 2436 to be preliminarily positioned to the main portion 242. The insertion of the right handle portion 2437 into the right groove 2428 enables the right handle portion 2437 to be preliminarily positioned to the main portion 242. Then, the left handle portion 2436 and the right handle portion 2437 are tightened by screws. Optionally, the main portion 242 includes a left housing portion 2421 and a right housing portion 2422. The left groove 2427 is formed on the left housing portion 2421. The right housing portion 2422 is formed on the right groove 2428. The left handle portion 2436 is inserted in the left groove 2427 on the left housing portion 2421 from the left side. The right handle portion 2437 is inserted in the right groove 2428 on the right housing portion 2422 from the right side.

As shown in FIG. 5, the main grip 2433 extends substantially along the center line 105, and the center line 105 intersects the front and rear direction to form an included angle α. The included angle α is greater than or equal to 5 degrees and less than or equal to 13 degrees, thereby implementing the cutting comfort for a user under nongeneral working conditions, such as operating at height or on a tree. In some examples, the center line 105 intersects the front and rear direction to form an included angle α. Moreover, the included angle α is greater than or equal to 8 degrees and less than or equal to 13 degrees.

Figure 6:
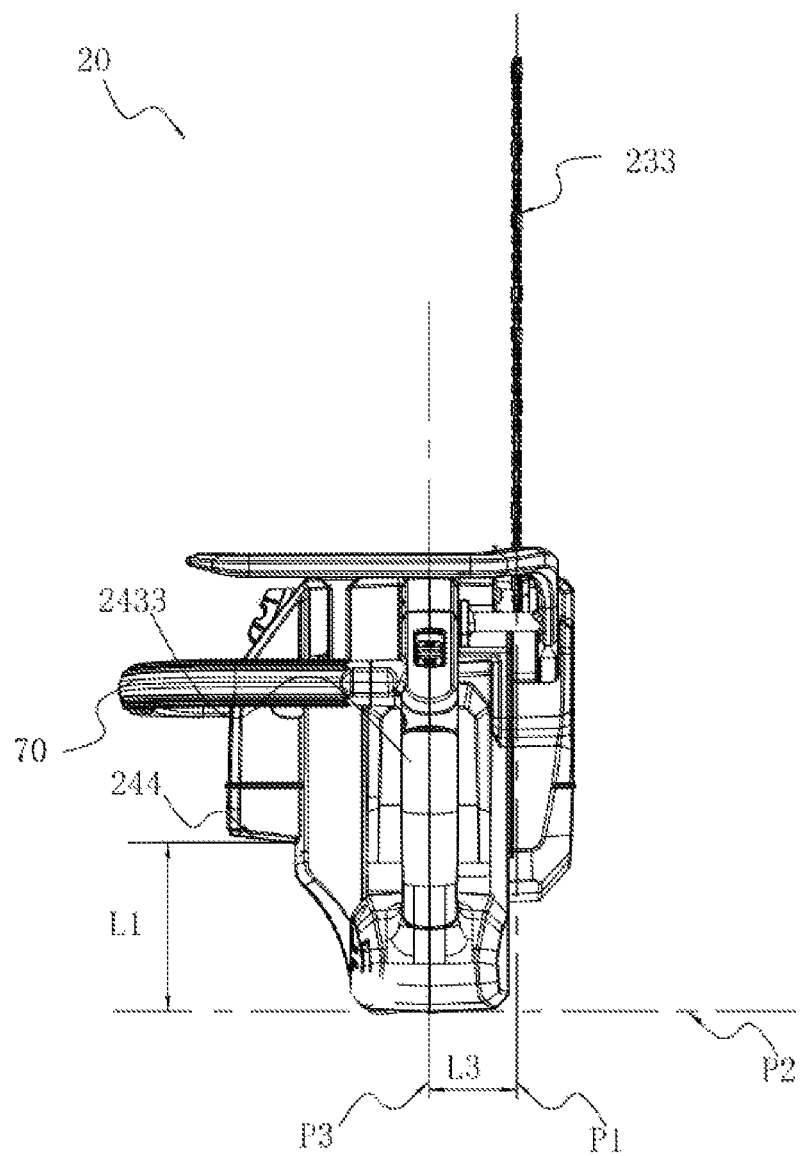
FIG. 6 is a top view of the main machine of FIG. 4.

As shown in FIG. 6, the main grip 2433 is at least partially symmetrical about a third plane P3. The third plane P3 is the split of the main grip 2433. Exemplarily, the left handle portion 2436 and the right handle portion 2437 are symmetrically disposed on two sides of the third plane P3, respectively. The guide plate 233 extends in the first plane P1. The first plane P1 is substantially parallel to the third plane P3. The guide plate 233 is disposed on the right side of the third plane P3. The distance L3 between the first plane P1 and the third plane P3 is equal to or less than 55 mm. In this manner, the main machine 20 has a good balance in the left and right direction, thereby facilitating the cutting by a user and improving the control performance.

As shown in FIGS. 3, 6, 15 to 17, the chainsaw 100 further includes an auxiliary handle 70. The auxiliary handle 70 includes an auxiliary grip 71. When a user operates the chainsaw 100, one hand grips the main handle 243, and another hand grips the auxiliary handle 70 so that the main machine 20 can be operated more stably. The auxiliary handle 70 is disposed on a side of the main handle 243 facing away from the guide plate 233, that is, the auxiliary handle 70 is disposed on the left side of the third plane P3. The auxiliary handle 70 is connected to the housing 24. The auxiliary handle 70 further includes a first connection portion 72 and a second connection portion 73. The first connection portion 72 is detachably connected to the main handle 243. The second connection portion 73 is detachably connected to the main portion 242. That is, the first connection portion 72 and the left handle portion 2436 may be an engagement connection, a threaded connection, a screw connection or the like. The second connection portion 73 and the left housing portion 2421 may be an engagement connection, a threaded connection, a screw connection or the like. To facilitate the detachment of the main handle 243, the auxiliary handle 70 may be disposed to be connected together with the main handle 243 to be detached. For example, the first connection portion 72 is connected to the left handle portion 2436 by screws.

Figure 19:
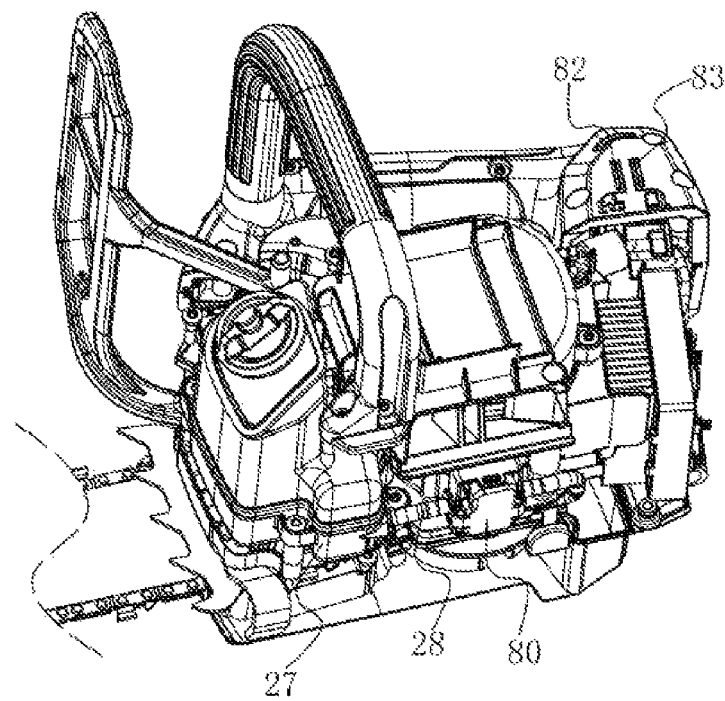
FIG. 19 is a perspective view of the main machine of FIG. 4 in which a left housing portion is detached.
Figure 20:
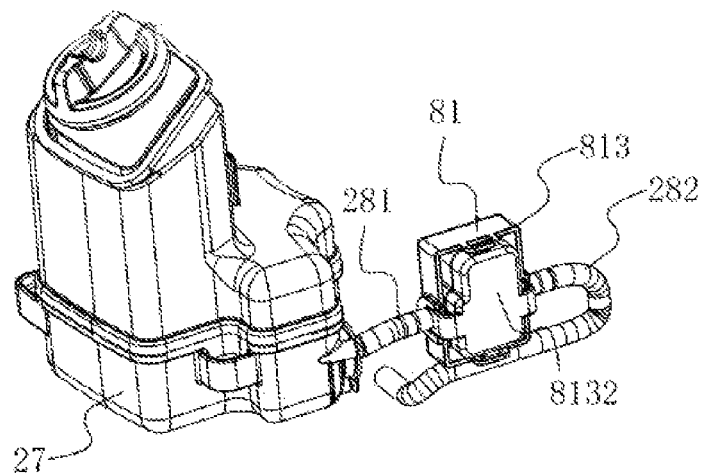
FIG. 20 is a perspective view of an oiler and part of an alarm device of FIG. 19.
Figure 21:
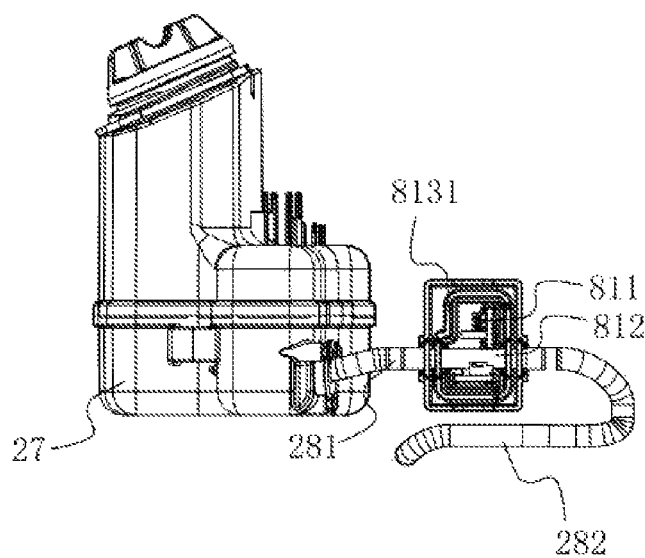
FIG. 21 is a plan view of the structure of FIG. 20.

As shown in FIGS. 19 to 21, the chainsaw 100 further includes an alarm device 80 and an oil pipe 28. The alarm device 80 is used to remind a user that the remaining amount of oil in the oiler 27 is small so that the user can add oil to the oiler 27 in time, thereby avoiding damage to the chainsaw 100 due to lack of oil. The oil pipe 28 is connected to the oiler 27 and is used to send the oil in the oiler 27 to the guide plate 233. The alarm device 80 includes an alarm component for alerting the oiler 27 of lack of oil and a detection assembly 81. The alarm component is an alarm lamp 82. A user grips the main handle 243 with the right hand, and the left hand can be placed on the auxiliary handle 70, that is, the user is at least partially located on the left side of the third plane P3. To facilitate the user to observe the amount of oil in the oiler 27, the alarm lamp 82 is disposed on the left side of the main handle 243. The main handle 243 is further provided with a power display lamp 83. The power display lamp 83 is used to display the remaining power of the battery pack 11. The power display lamp 83 and the alarm lamp 82 are disposed on the left side of the main handle 243. The alarm lamp 82 and the power display lamp 83 are disposed on the left side of the third plane P3. To facilitate the connection between the circuit board 26, the alarm lamp 82 and the power display lamp 83, the alarm lamp 82 and the power display lamp 83 are disposed adjacent to the circuit board 26. Exemplarily, the alarm lamp 82 and the power display lamp 83 are disposed at the rear end portion 2432 of the main handle 243, that is, in the front and rear direction, the motor 22 is disposed between the oiler 27 and the power display lamp 83, and the motor 22 is also disposed between the oiler 27 and the alarm lamp 82. In this example, the battery pack 11 is disposed separately from the main machine 20. Moreover, the power display lamp 83 is disposed on the main machine 20, thereby facilitating a user to observe the remaining power of the battery pack 11 during operation.

The detection assembly 81 is used to detect whether there is oil in the oil pipe 28. Optionally, the detection assembly 81 is disposed adjacent to the oiler 27. The detection assembly 81 includes a detection component, a connecting pipe 812 and a mounting housing 813. The detection component is a light sensor 811. The light sensor 811 is used to detect whether there is oil passing through the connecting pipe 812. The connecting pipe 812 is used to connect the oil pipe 28. The light sensor 811 is disposed in the mounting housing 813. The connecting pipe 812 is at least partially disposed in the mounting housing 813. Moreover, the light sensor 811 is disposed adjacent to the connecting pipe 812. Optionally, the oil pipe 28 has a first segment 281 and a second segment 282. Moreover, the connecting pipe 812 connects the first segment 281 and the second segment 282. The detection assembly 81 is disposed between the first segment 281 and the second segment 282. The connecting pipe 812 is disposed between the first segment 281 and the second segment 282 to connect the first segment 281 and the second segment 282. The oil pipe 28 is divided into two segments, that is, the first segment 281 and the second segment 282. The connecting pipe 812 is disposed between the first segment 281 and the second segment 282 to connect the first segment 281 and the second segment 282. Thus, the first segment 281, the connecting pipe 812 and the second segment 282 form an oil passage. In this manner, when the detection assembly 81 fails, a user can detach the detection assembly 81 from the oil pipe 28 for replacement or maintenance, that is, the detection assembly 81 is provided as a module that facilitates detachment. The light sensor 811 detects whether or not there is oil passing through the connecting pipe 812, converts the light energy into an electrical signal and transmits the electrical signal to the circuit board 26. The circuit board 26 receives the electrical signal. Then the circuit board 26 according to the electrical signal controls the alarm lamp 82 to issue an alarm signal.

The motor 22 is disposed between the oiler 27 and the circuit board 26. In the front and rear direction, the oiler 27 is disposed on the front side of the motor 22, and the circuit board 26 is disposed on the rear side of the motor 22. The detection assembly 81 is disposed on the rear side of the oiler 27, and the detection unit 81 is also disposed on the lower side of the motor 22. In this manner, the space on the lower side of the motor 22 can be fully utilized, thereby improving the compactness of the main machine 20 and reducing the volume of the main machine 20.

The light sensor 811 includes a light-emitting component and a receiving component. The light-emitting component is used to emit light. The receiving component is used to receive the light emitted from the light-emitting component. The light-emitting component and the receiving component are disposed on two sides of the connecting pipe 812, respectively. When there is no oil in the connecting pipe 812, the light emitted from the light-emitting component is dispersed, and the receiving component does not receive enough light. At this time, the oiler 27 is in a state of oil shortage, and the alarm lamp 82 displays a signal of oil shortage. When there is oil in the connecting pipe 812, the light is refracted and converged by the oil passage. The receiving component receives enough light. At this time, the oiler 27 is in a state of having oil, and the alarm lamp 82 displays a signal of having oil. In this example, the alarm lamp 82 is an LED lamp. The LED lamp flashes when the oiler 27 is in a state of oil shortage. Moreover, the LED lamp is off when the oiler 27 is in a state of having oil. Alternatively, in other examples, the alarm lamp emits red light when the oiler is in a state of oil shortage, and the alarm lamp emits green light when the oiler is in a state of having oil.

In this example, the oiler 28 is set as a non-transparent member, and the connecting pipe 812 is set as a transparent member. The oil pipe 28 is disposed outside the mounting housing 813. Moreover, the oil pipe 28 does not extend into the mounting housing 813. The connecting pipe 812 is partially located in the mounting housing 813. Moreover, the connecting pipe 812 extends outside the mounting housing 813 to connect to the oil pipe 28. The connecting pipe 812 extends into the oil pipe 28. The oil pipe 28 is partially sleeved outside the connecting pipe 812. In this manner, in the case where the light emitted by the detection assembly 81 can pass through the connecting pipe 812, the light from the outside of the mounting housing 813 can be prevented from entering the mounting housing 813 through the oil pipe 28 and the connecting pipe 812, thereby affecting the accuracy of detection by the detection assembly 81.

The mounting housing 813 includes a first housing 8131 and a second housing 8132. The first housing 8131 engages with the second housing 8132 to form a mounting space. The connecting pipe 812 is at least partially fixed in the mounting space. The light sensor 811 is fixedly disposed in a detection space. The connecting pipe 812 and the light sensor 811 are fixedly connected to the first housing 8131. After the connecting pipe 812 and the light sensor 811 are disposed in the first housing 8131, insulation adhesive is injected into the first housing 8131, thereby effectively preventing ash and water vapor from entering the light sensor 811 and the connecting pipe 812, thereby improving the performance of the detection assembly 81 and prolonging the service life of the detection assembly 81.

As shown in FIGS. 1 to 3, the connection assembly 3 further includes a safety assembly 50. The safety assembly 50 includes a safety component. The safety component is a safety valve 51. When a force applied to the safety component is greater than or equal to a preset safety value, the safety component is opened to make the mechanical connection between the battery pack 11 and the main machine 2 disconnected by the connection assembly 3, thereby allowing the main machine 2 to separate from the battery pack 22. The force may be a force continuously applied to the safety component or a force instantaneously applied to the safety component.

The battery pack 11 is separated from the main machine 20 and is mounted on the body of a user. When the safety component is opened, the connection between the battery pack 11 and the user and the main machine 20 is opened, thereby implementing the separation of the main machine 20 from the battery pack 11 and the separation of the main machine 20 from the user. In this manner, when the main machine 20 is subjected to a large external force, it is possible to avoid damage to the user caused by the external force transmitted by the main machine to the user.

The battery pack 11 is connected to the mounting base 40. The mounting base 40 may be mounted on the body of a user. In this example, the chainsaw 100 may further include a waistband 200. The waistband 200 is mounted on the waist of a user. The waistband 200 may be considered as a part of the chainsaw 100 or a part outside the chainsaw 100, such as a waistband provided by the user. The mounting base 40 can be detachably mounted on the waistband 200. The battery pack 11 is detachably mounted on the mounting base 40. In this case, when the safety component is opened, the main machine 20 is disconnected from the mounting base 40 by the safety component, thereby implementing the separation of the main machine 20 from the battery pack 11, the separation of the main machine 20 from the waistband 200 and the separation of the main machine 20 from the user. The safety component is connected to the main machine 20 so that when the main machine 20 is subjected to a large external force, the external force is transmitted to the safety component to cause the safety component subjected to a force greater than or equal to the preset safety value. At this time, the safety component is opened. Moreover, the power output interface 33 of the power cord 30 is disconnected from the main machine 20 by the external force applied to the main machine 20, and thus the connection between the main machine 20 and the power cord 30 is disconnected, and the connection between the main machine 20 and the connection assembly 3 is disconnected. In other examples, the power cord may be fixedly connected to the main machine, and the power cord is detachably connected to the mounting base or the battery pack. In this case, the safety component may be correspondingly connected to the mounting base or the battery pack. When the safety component is opened, the whole formed by the main machine and the power cord is separated from the mounting base and the battery pack under the action of an external force. Thus, the whole formed by the main machine and the power cord is separated from a user.

The safety assembly 50 further includes a safety rope 52. The safety valve 51 is fixedly mounted on the safety rope 52. Since the main machine 20 and the battery pack 11 are provided separately, and the battery pack 11 is carried by a user, the safety rope 52 is used to connect the main machine 20 and the user. One end of the safety rope 52 is fixedly connected to the waistband 200, the mounting base 40 or the battery pack 11. Another end of the safety rope 52 is detachably connected to the main machine 20. In this manner, when the safety valve 51 is opened, the safety valve 51 and the safety rope 52 are connected with the user, and the main machine 20 can be separated from the whole formed by the user, the waistband 200, the mounting base 40, the power cord 30, the safety rope 52 and the safety valve 51. The end of the safety rope 52 facing away from the main machine 20 is fixedly connected to the mounting base 40. The safety rope 52 is provided with a first connector 521 and a second connector 522. The first connector 521 can be detachably connected to the waistband 200. The second connector 522 also can be detachably connected to the waistband 200. When the first connector 521 is connected to the waistband 200, the distance between the main machine 20 and the waistband 200 is large and is suitable for the user to cut vegetation with a relatively long distance. When the second connector 522 is connected to the waistband 200, the distance between the main machine 20 and the waistband 200 is small and is suitable for the user to cut vegetation with a short distance, Moreover, in this case, the danger of the safety rope 52 being easily scraped by an external object due to being too long can be avoided.

The safety rope 52 is connected to the main machine 20 by the safety valve 51. The safety rope 52 is connected to the waistband by the first connector 521 or the second connector 522. When a force applied to the safety valve 51 is greater than or equal to the preset safety value, the safety valve 51 is opened to make the safety rope 52 disconnected from the main machine 20. At this time, the connection between the safety rope 52 and the waistband 200 is not disconnected. The number of safety valves 51 may be one or more. The number of intermediate connectors may be one or more. If multiple safety valves 51 are provided for connecting the safety rope 52 and the main machine 20, the preset safety value set at this time should be smaller than that in the case of one safety valve 51. Multiple safety valves 51 can cause the main machine 20 to lose more momentum during the falling process so that the main machine 20 may not be damaged when landing, thereby reducing the loss of a user.

In this example, the preset safety value is greater than or equal to 15 pounds and less than or equal to 400 pounds. On the one hand, the preset safety value cannot be set too small so that it is possible to prevent the main machine 20 from falling when the main machine 20 is subjected to a small external force, causing a loss to a user. On the other hand, the preset safety value cannot be set too large so that it is possible to avoid the damage to a user caused when the main machine 20 can be separated from the user only by a large external force. In this example, the preset safety value is greater than or equal to 25 pounds and less than or equal to 200 pounds. Exemplarily, when the safety rope 52 or the main machine 20 is subjected to the instantaneous action of an external object, the main machine 20 falls quickly. At this time, the safety valve 51 is subjected to a dynamic force, and the safety valve 51 may be opened under the action of a dynamic force. However, since the dynamic force to which the safety valve 51 is subjected cannot be detected, the preset safety value of the safety valve 51 in this example refers to the magnitude of a static force to which the safety valve 51 is subjected when the safety valve 51 is opened. For example, when the safety valve 51 is opened by a pull at rest, the magnitude of the pull can be understood as a preset safety value.

After the preset safety value is set, when a force applied to the safety valve 51 is greater than or equal to the preset safety value, the safety valve 51 is opened. Alternatively, after the preset safety value is set, when the force applied to the safety valve 51 is greater than the preset safety value, the safety valve 51 is opened.

In other examples, the safety rope may not be provided with an intermediate connector and a safety valve. Moreover, the safety rope is made to break when subjected to a preset force, that is, by using the material characteristics of the safety rope, the safety rope is broken when the force on the safety rope is greater than or equal to the preset safety value so that the connection between a user and the main machine 20 is disconnected. Optionally, the material of the safety rope may be uniform. In this case, when a force applied to any segment of the safety rope is greater than or equal to the preset safety value, the safety rope is broken. Alternatively, the material of the safety rope may be non-uniform. In this case, as long as part of the safety rope subjected to a force greater than or equal to the preset safety value is broken, the connection between the main machine and a user can be disconnected.

Figure 22:
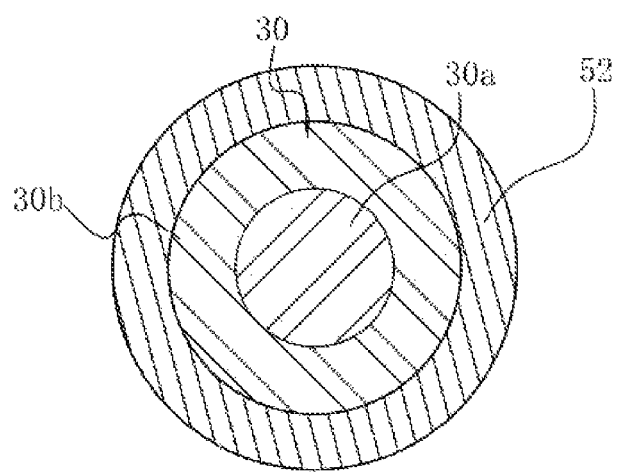
FIG. 22 is a sectional view of a power cord and a safety rope of FIG. 1.

In this example, the power cord 30 is connected to the main machine 20 and the battery pack 11 on a user so that the battery pack 11 is electrically connected to the main machine 20. Moreover, the power cord 30 is detachably connected to the main machine 20. Therefore, when the main machine 20 is subjected to a force less than the preset safety value, the power cord 30 can be disconnected from the main machine 20. The safety rope 52 connects the main machine 20 and the mounting base 40 connected to a user. When the force applied to the safety rope 52 is greater than or equal to the preset safety value, the connection between the power cord 30 and the main machine 20 is disconnected, and the connection between the safety rope 52 and the main machine 20 is disconnected. The safety rope 52 and the power cord 30 may be disconnected or connected. When the safety rope 52 and the power cord 30 are disconnected, the maximum extension length of the safety rope 52 should be set to be less than the maximum extension length of the power cord 30, thereby ensuring the safety of the user during operation. When the safety rope 52 and the power cord 30 are disconnected, there are two wires between the main machine 20 and the user, and problems such as power-off and unstable operation are easily caused by interference or winding. To avoid the preceding problems, in the present application, the safety rope 52 and the power cord 30 are connected together so that the entire assembly structure is more simplified. The safety rope 52 and the power cord 30 may only be limited by the limiting member without contact or may be sleeved or connected together. In this example, as shown in FIG. 22, the safety rope 52 is wound or wrapped around the surface of the power cord 30. Moreover, the safety rope 52 extends along the extension direction of the power cord 30, and the length of the safety rope 52 is less than the length of the power cord 30. The material of the safety rope 52 and the power cord 30 is not limited. The safety rope 52 is made of a non-elastic material.

As shown in FIG. 1 and FIG. 22, the power cord 30 includes a wire core 30a and an insulating sleeve 30b. The insulating sleeve 30b surrounds the wire core 30a, and the insulating sleeve 30b protects the wire core 30a. The safety rope 52 has a length direction. The safety rope 52 is formed with a through hole extending through the safety rope along the length direction. At least one end of the insulating sleeve 30b extends through the safety rope 52. In this example, the safety rope 52 is made of a fiber material, and the insulating sleeve 30b is made of a rubber material.

In this example, the length of the power cord 30 is greater than or equal to 0.5 m and less than or equal to 2.5 m. Exemplarily, the length of the power cord 30 is greater than or equal to 1 m and less than or equal to 2 m. In this manner, the length of the power cord 30 can not only satisfy the need for the user to cut the vegetation at a long distance, but also avoid the problem that the power cord 30 is easily wound around plants or the arm due to being too long.

The length of the safety rope 52 is greater than or equal to 0.5 m and less than or equal to 2.5 m. For example, the length of the power cord 30 is greater than or equal to 1 m and less than or equal to 2 m. In this example, the length of the safety rope 52 is less than the length of the power cord 30.

The ratio of the length of the power cord 30 to the length L2 of the portion of the guide plate 233 extending out of the housing 24 is greater than or equal to 2 and less than or equal to 10. Exemplarily, the ratio of the length of the power cord 30 to the length L2 of the portion of the guide plate 233 extending out of the housing 24 is greater than or equal to 3 and less than or equal to 6. In this manner, the weight of the chainsaw 100 can be reduced, and the length of the power cord 30 and the length L2 of the portion of the guide plate 233 extending out of the housing 24 can meet the farthest cutting distance required by the user.

The housing 24 is formed with a connection portion 24c. The safety valve 51 is detachably connected to the connection portion 24c. When a force applied to the safety valve 51 is greater than or equal to the preset safety value, the safety valve 51 is separated from the connection portion 24c, thereby implementing the separation of the safety valve 51 from the main machine 20. The connection portion 24c is disposed on the rear end surface 246 of the main machine 20. The connection portion 24c is a hang buckle. The hang buckle is rotatably connected to the rear end surface 246 of the main machine 20. Thus, as shown in FIG. 1, the user may open the hang buckle as required. Alternatively, as shown in FIG. 2, the hang buckle may be in a state of adhering to the housing 24.

Figure 23:
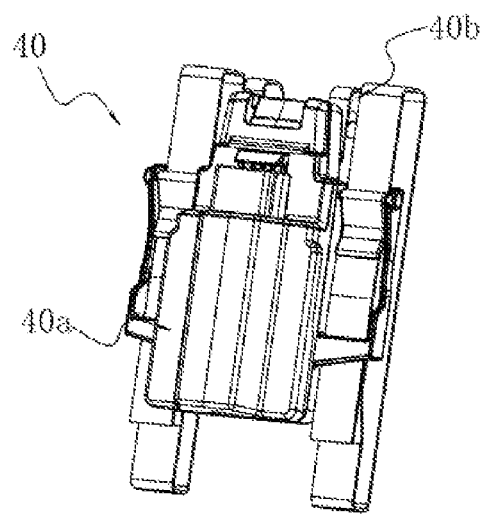
FIG. 23 is a perspective view of a mounting base of FIG. 1.
Figure 24:
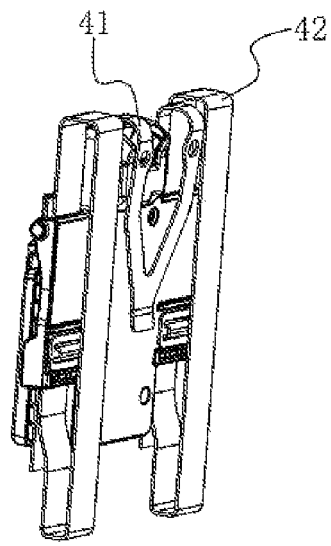
FIG. 24 is another perspective view of a mounting base of FIG. 1.
Figure 25:
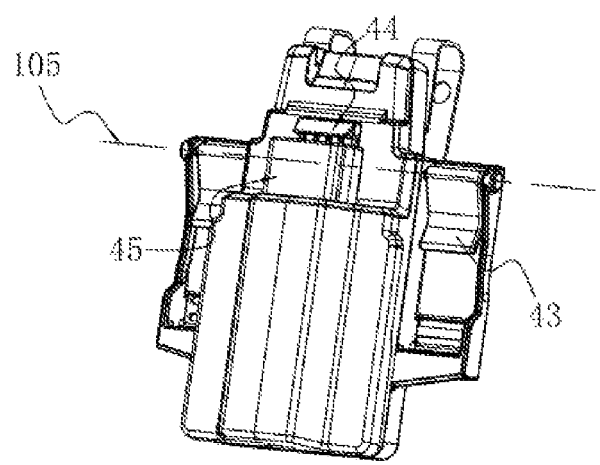
FIG. 25 is a perspective view of the mounting base of FIG. 23 in which a second connector is detached.
Figure 26:
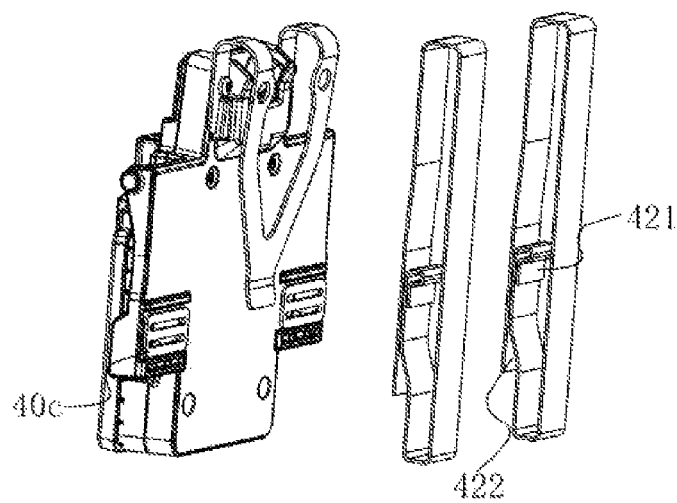
FIG. 26 is a perspective view of the mounting base of FIG. 23 in which a second connector is detached.
Figure 27:
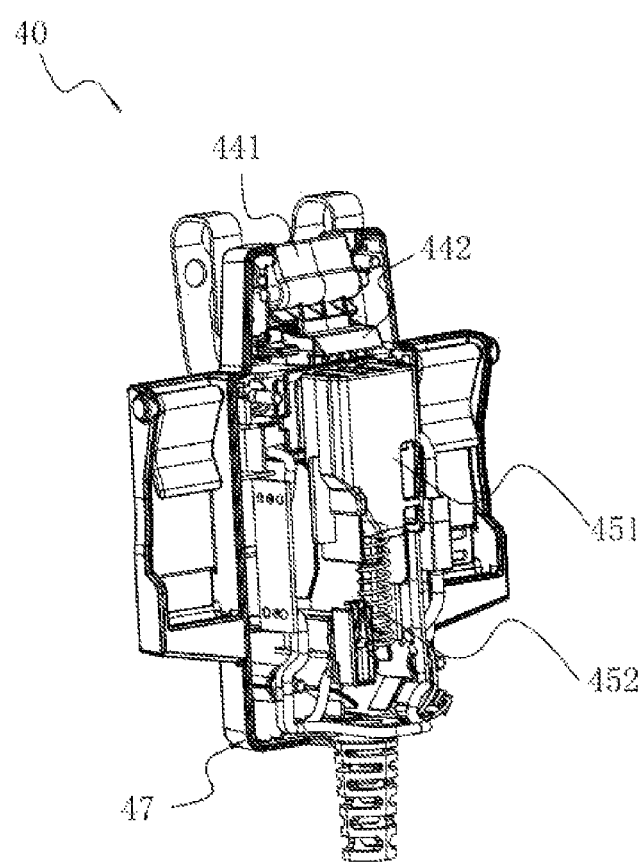
FIG. 27 is a perspective view of the structure of FIG. 25 in which a base is opened and in which an ejector is ejected by an elastic member.
Figure 28:
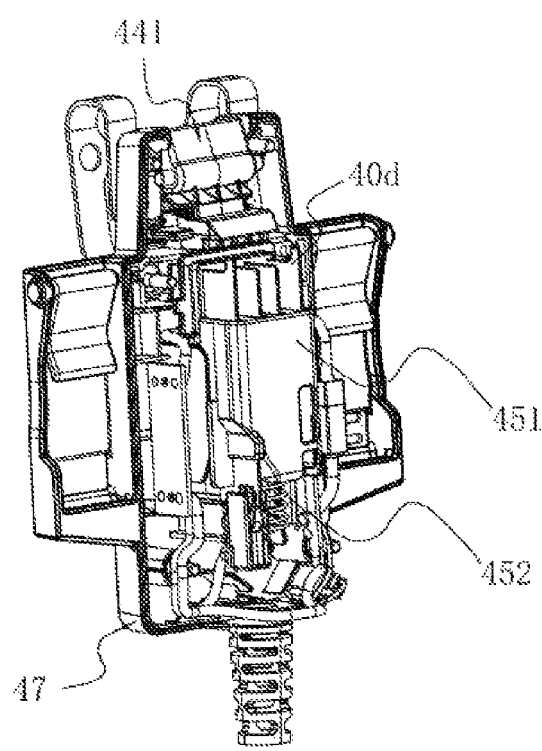
FIG. 28 is a perspective view of the structure of FIG. 25 in which a base is opened and in which a pole piece is exposed.

As shown in FIG. 1 and FIG. 23, the mounting base 40 includes a base 40a and a connection mechanism 40b. The base 40a is configured as a base for the battery pack 11 to be mounted on. The connection mechanism 40b is configured to connect the mounting base 40 to the waistband 200 of a user. As shown in FIGS. 23 to 26, the connection mechanism 40b includes a first connector that can be connected to the waistband 200 of a user in a first connection manner. The first connector may be a hook 41. The connection mechanism 40b also includes a second connector connected to the waistband 200 of a user in a second connection manner. The second connector is a connecting band 42. That is, the mounting base 40 is inserted in the waistband 200 of a user through the hook 41 to implement the preliminary positioning of the mounting base 40. In this example, the hook 41 is a metal member, connecting bands 42 are flexible members, and the connecting bands 42 are made of a fiber material. The hook 40 is used to hang the mounting base 40 on the waistband 200 of a user. The connecting bands 42 are used to bind the mounting base 40 on the waistband of a user. The hook 41 is connected to the mounting base 40 by screws. The connecting bands 42 are detachably mounted on the mounting base 40.

The mounting base 40 further includes an adjusting member for adjusting the degree of tightness of the connecting bands 42. The adjusting member is a switch knob 43 that can rotate around the axis 105. A gap for the connecting bands 42 to extend through is formed between the switch knob 43 and the base 40a. The connecting band 42 includes a first free end 421 and a second free end 422. An adjustment buckle 40c is formed or connected to the base 40a. When it is necessary to mount the connecting bands 42 to the waistband 200 of a user, the first free ends 421 of the connecting bands 42 are first mounted on the adjustment buckle 40c. The connecting bands 42 then extend through the waistband 200. Next, the switch knob 43 is opened, and the second free ends 422 of the connecting bands 42 extend through the gap between the switch knob 43 and the base 40a. Finally, the second free ends 422 are tightened, and the switch knob 43 is closed so that the mounting base 40 is stably connected to the waistband 200. In this example, the number of connecting bands 42 is two, and the hook 41 is disposed between the two connecting bands 42. In this manner, the mounting base 40 is more firmly mounted. Thus, the mounting base 40 is prevented from being shaken by force and causing the mounting base 40 to separate from the waistband 200.

As shown in FIGS. 25 to 28, the mounting base 40 further includes a lock assembly 44 and an ejection assembly 45. The lock assembly 44 is used to lock and release the battery pack 11. The ejection assembly 45 is used to eject the battery pack 11 when the lock assembly 44 releases the battery pack 11, thereby protecting pole pieces 40d inside the mounting base 40, preventing the user from contacting the pole pieces 40d and facilitating the user to replace the battery pack 11. Optionally, the ejection assembly 45 is movably connected to the base 40a. The ejection assembly 45 includes an ejector 451 and an elastic member 452. The lock assembly 44 is movably connected to the base 40a. The lock assembly 44 includes a dial button 441 and a latch 442. In an example, one end of the elastic member 452 is connected to the ejector 451, and another end of the elastic member 452 is connected to the base 40a. When the battery pack 11 is not bonded to the mounting base 40, the elastic member 452 ejects the ejector 451 to a first position. At this time, the pole pieces 40d are located inside the ejector 451 so that ash and water vapor can be prevented from sticking to the pole pieces 40d. When the battery pack 11 is inserted in the mounting base 40, the ejector 451 is pressed by the battery pack 11 to move along a direction facing away from the pole pieces 40d, and the pole pieces 40d are exposed. Thus, the mounting base 40 is electrically connected to the battery pack 11, and the latch 442 latches the battery pack 11. When a user dials the dial button 441 to release the battery pack 11, the dial button 441 drives the latch 442 to unlock, and the ejector 451 is acted by the elastic member 452 to eject the battery pack 11. At this time, the ejector 451 can completely cover the pole pieces 40d.

What is claimed is:

1. A chainsaw, comprising:
   a main machine;
   a battery pack configured to supply energy to the main machine, wherein the battery pack and the main machine are separated from each other; and
   a connection assembly configured to connect the main machine and the battery pack so that the battery pack is electrically connected to the main machine,
   wherein the main machine comprises:
   a chain configured to perform a cutting function;
   a guide plate configured to support the chain;
   a motor configured to drive the chain to move; and
   a housing configured to accommodate at least part of the motor;
   wherein the connection assembly is detachably connected to the main machine or the battery pack, the guide plate extends forward out of the housing, and a ratio of a weight of the main machine to a length of a portion of the guide plate extending out of the housing is greater than or equal to 6 kg/m and less than or equal to 20 kg/m.

2. The chainsaw according to claim 1, wherein the connection assembly comprises a safety component and the safety component is opened to make the connection assembly be capable of disconnecting the connection between the battery pack and the main machine when a force applied to the safety component is greater than or equal to a preset safety value.

3. The chainsaw according to claim 2, wherein the connection assembly further comprises a safety rope, the safety component is mounted on the safety rope, and the safety component is configured to be connected to the main machine.

4. The chainsaw according to claim 3, wherein the connection assembly further comprises a mounting base for the battery pack to be mounted on and a power cord comprising a first end configured to be connected to the battery pack or the mounting base and a second end configured to be connected to the main machine and the second end of the power cord is detachably connected to the main machine.

5. The chainsaw according to claim 4, wherein the housing comprises a power insertion interface, an access terminal is disposed inside the power insertion interface, the second end of the power cord is provided with a power output interface detachably connected to the power insertion interface, the safety component is a safety valve, and the safety valve is opened so that the safety component is disconnected from the main machine and so that the power cord is separated from the power insertion interface when a force applied to the safety valve is greater than or equal to the preset safety value.

6. The chainsaw according to claim 2, wherein the preset safety value is greater than or equal to 15 pounds and less than or equal to 400 pounds.

7. The chainsaw according to claim 2, wherein the preset safety value is greater than or equal to 25 pounds and less than or equal to 200 pounds.

8. The chainsaw according to claim 4, wherein the mounting base comprises a base configured to combine the battery pack and a connector configured to make the mounting base mounted to a waistband of a user, and the connector is a flexible member.

9. The chainsaw according to claim 4, wherein the mounting base comprises a base configured to combine the battery pack, a first connector configured to make the mounting base mounted to a waistband of a user in a first connection manner, and a second connector configured to make the mounting base mounted to a waistband of a user in a second connection manner, and the first connector is a non-flexible member, and the second connector is a flexible member.

10. The chainsaw according to claim 1, wherein the connection assembly comprises a mounting base for the battery pack to be mounted on and a power cord comprising a first end configured to be connected to the battery pack or the mounting base and a second end configured to be connected to the main machine, the mounting base comprises a base configured to combine the battery pack and a connector configured to make the mounting base mounted to a waistband of a user, and the connector is a flexible member.

11. The chainsaw according to claim 3, wherein the connection assembly further comprises a mounting base for the battery pack to be mounted on and a power cord comprising a first end configured to be connected to the battery pack or the mounting base and a second end configured to be connected to the main machine.

12. The chainsaw according to claim 11, wherein the safety rope surrounds a surface of the power cord.

13. The chainsaw according to claim 11, wherein a length of the safety rope is substantially fixed.

14. The chainsaw according to claim 11, wherein the safety rope is a non-elastic rope.

15. The chainsaw according to claim 11, wherein a ratio of a length of the power cord to the length of the portion of the guide plate extending out of the housing is greater than or equal to 2 and less than or equal to 10.

16. The chainsaw according to claim 11, wherein the power cord comprises a wire core and an insulating sleeve surrounding the wire core, the safety rope has a length direction, the safety rope is formed with a through hole extending through the safety rope along the length direction, and at least one end of the insulating sleeve passes through the safety rope.

17. The chainsaw according to claim 5, wherein the housing comprises a main handle, the main handle is disposed on an upper side of the housing, the power insertion interface is disposed on a left side of the main handle, and the guide plate is disposed on a right side of the main handle.

18. The chainsaw according to claim 5, wherein the housing further comprises a front end surface formed with a front port for the guide plate to extend out and a rear end surface opposite to the front end surface and, in a front and rear direction, the power insertion interface is disposed between the front end surface and the rear end surface.

19. The chainsaw according to claim 5, wherein the power insertion interface is formed with a connection port opened rearward and the second end of the power cord is inserted in the power insertion interface through the connection port.

20. The chainsaw according to claim 1, wherein the ratio of the weight of the main machine to the length of the portion of the guide plate extending out of the housing is greater than or equal to 8.5 kg/m and less than or equal to 13 kg/m.

21. The chainsaw according to claim 1, wherein a ratio of an output power of the motor to the weight of the main machine is greater than or equal to 250 W/kg and less than or equal to 800 W/kg.

* * * * *